(12) United States Patent
Pan et al.

(10) Patent No.: US 10,128,497 B2
(45) Date of Patent: Nov. 13, 2018

(54) WATER-FREE TITANIA-BRONZE THIN FILMS WITH SUPERFAST LITHIUM ION TRANSPORT

(71) Applicant: THE REGENTS OF THE UNIVERSITY OF MICHIGAN, Ann Arbor, MI (US)

(72) Inventors: Xiaoqing Pan, Ann Arbor, MI (US); George W. Graham, Ann Arbor, MI (US); Michael B. Katz, Washington, DC (US); Kui Zhang, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 409 days.

(21) Appl. No.: 14/848,957

(22) Filed: Sep. 9, 2015

(65) Prior Publication Data

US 2016/0072124 A1  Mar. 10, 2016

Related U.S. Application Data

(60) Provisional application No. 62/048,115, filed on Sep. 9, 2014.

(51) Int. Cl.
| | |
|---|---|
| *H01M 4/36* | (2006.01) |
| *H01M 4/1391* | (2010.01) |
| *H01M 4/525* | (2010.01) |
| *H01M 4/56* | (2006.01) |
| *H01M 4/485* | (2010.01) |
| *H01M 4/131* | (2010.01) |

(Continued)

(52) U.S. Cl.
CPC .......... *H01M 4/366* (2013.01); *C01G 23/006* (2013.01); *C01G 23/047* (2013.01); *H01M 4/0423* (2013.01); *H01M 4/0471* (2013.01); *H01M 4/131* (2013.01); *H01M 4/1391* (2013.01); *H01M 4/485* (2013.01); *C01P 2002/50* (2013.01); *C01P 2002/54* (2013.01); *H01M 10/052* (2013.01)

(58) Field of Classification Search
None
See application file for complete search history.

(56) References Cited

U.S. PATENT DOCUMENTS

2011/0052994 A1\* 3/2011 Harada ............... C01G 23/001
 429/231.5
2011/0192325 A1  8/2011 Ancora et al.
(Continued)

OTHER PUBLICATIONS

Armstrong, A. R., et al., "Lithium-Ion Intercalation into $TiO_2$-B Nanowires", Adv. Mater., 2005, vol. 17, pp. 862-865.
(Continued)

*Primary Examiner* — Jonathan G Leong
*Assistant Examiner* — Christopher P Domone
(74) *Attorney, Agent, or Firm* — Harness, Dickey & Pierce, P.L.C.

(57) ABSTRACT

A multilayered structure including a substrate and a layer of calcium-doped bronze is disclosed. A multilayered structure including a substrate, a layer of calcium-doped bronze, and a layer of pure bronze is also disclosed. A method for fabricating a multilayer structure including a substrate and a layer of calcium-doped bronze is also disclosed.

36 Claims, 20 Drawing Sheets

(51) Int. Cl.
  *H01M 4/04*   (2006.01)
  *C01G 23/00*  (2006.01)
  *C01G 23/047* (2006.01)
  *H01M 10/052* (2010.01)

(56) References Cited

U.S. PATENT DOCUMENTS

| | | | | |
|---|---|---|---|---|
| 2013/0344392 A1* | 12/2013 | Huang | ............... | H01M 4/366 429/231.8 |
| 2015/0236374 A1* | 8/2015 | Asano | ............... | H01M 10/0562 429/322 |

OTHER PUBLICATIONS

Arrouvel, C. et al., "Lithium Insertion and Transport in the $TiO_2$- B Anode Material: A Computational Study", Chem. Mater. 2009, vol. 21, pp. 4778-4783.

Deak, P. et al., "Accurate defect levels obtained from the HSE06 range-separated hybrid functional", Phys. Rev. B, 2010, vol. 81, 153203 (4 pages).

Etacheri, V. et al., "Mesoporous $TiO_2$- B microflowers composed of (1 1 0) facet-exposed nanosheets for fast reversible lithium-ion storage", J. Mater. Chem. A, 2013, vol. 1, pp. 12028-12032.

Guo, C.F. et al., "A Strategy to Prepare Wafer Scale Bismuth Compound Superstructures", Small, 2013, vol. 9, No. 14, pp. 2394-2398.

Kim, S. J. et al., "Atomic structure of defects and interfaces in $TiO_2$- B and $Ca:TiO_2$- B ($CaTi_5O_{11}$) films grown on $SrTiO3$". CrystEngComm, 2015, vol. 17, pp. 4309-4315.

Liu, H. et al., "Mesoporous $TiO_2$- B Microspheres with Superior Rate Performance for Lithium Ion Batteries", Adv. Mater., 2011, vol. 23, pp. 3450-3454.

Liu, S. et al., "Nanosheet-Constructed Porous $TiO_2$- B for Advanced Lithium Ion Batteries", Adv. Mater., 2012, vol. 24, pp. 3201-3204.

Liu, S. H. et al., "A Flexible $TiO_2$ (B)-Based Battery Electrode with Superior Power Rate and Ultralong Cycle Life", Adv. Mater., 2013, vol. 25, pp. 3462-3467.

Lotnyk, A. et al., "Epitaxial growth of $TiO_2$ thin films on $SrTiO_3$, $LaAlO_3$ and yttria-stabilized zirconia substrates by electron beam evaporation", Thin Solid Films, 2007, vol. 515, pp. 3439-3447.

Marchand, R.et al., "$TiO_2$ (B): A New Form of Titanium Dioxide and the Potassium Octatitanate $K_2Ti_8O_{17}$", Mater. Res. Bull., 1980, vol. 15, pp. 1129-1133.

Mi, S. B. et al. "Atomic structure of the interface between $SrTiO_3$ thin films and Si (001) substrates." Appl. Phys. Lett., 2008, vol. 93, pp. 101913-1-101913-3.

Okumura, T. et al., "Electronic and local structural changes with lithium-ion insertion in $TiO_2$- B: X-ray absorption spectroscopy study", J. Mater. Chem., 2011, vol. 21, pp. 15369-15377.

Panduwinata, D. and Gale, J.D, "A first principles investigation of lithium intercalation in $TiO_2$- B", J. Mater. Chem., 2009, vol. 19, pp. 3931-3940.

Ren, Y. et al., "Nanoparticulate $TiO_2$ (B): An Anode for Lithium-Ion Batteries", Angew. Chem.—Int. Edit., 2012, vol. 51, pp. 2164-2167.

Shinohara, R. et al., "High-quality epitaxial $TiO_2$ thin films grown on $\alpha-Al_2O_3$ substrates by pulsed laser deposition", J. Mater. Sci. Lett., 2002, J. Mater. Sci. Lett, 2002, vol. 21, pp. 967-969.

Wessel, C. et al., "Ionic-Liquid Synthesis Route of $TiO_2$ (B) Nanoparticles for Functionalized Materials", Chem.—Eur. J., 2011, vol. 17, pp. 775-779.

Zhang, K. et al., "Water-Free Titania-Bronze Thin Films with Superfast Lithium-Ion Transport", Adv. Mater., 2014, vol. 26, pp. 7365-7370.

Zhang, K. et al., "Creating high quality $Ca:TiO_2$- B ($CaTi5O11$) and $TiO_2$- B epitaxial thin films by pulsed laser deposition." Chemical Communications, May 21, 2015, vol. 51, No. 41, pp. 8561-8716.

\* cited by examiner

1

WATER-FREE TITANIA-BRONZE THIN FILMS WITH SUPERFAST LITHIUM ION TRANSPORT

CROSS-REFERENCE TO RELATED APPLICATIONS

This application claims the benefit of U.S. Provisional Application No. 62/048,115, filed on Sep. 9, 2014. The entire disclosure of the above application is incorporated herein by reference in its entirety.

BACKGROUND

This section provides background information related to the present disclosure which is not necessarily prior art.

Energy storage materials with high capacity and rapid charge/discharge rate are of great interest in lithium ion batteries (LIBs), especially for expanding the application to high power systems such as electric vehicles. The bronze polymorph of titanium dioxide (also referred to as $TiO_2$—B, $TiO_2$(b), $TiO_2$(bronze), titania bronze, "bronze," etc.) is an excellent candidate due to its open structure and fast lithium ion transport via a pseudocapacitive Faradaic process leveraging ultrahigh discharge rates comparable to those of supercapacitors while maintaining the advantage of storing energy in the bulk. However, existing forms of powder/slurry prepared by conventional hydrothermal methods pose certain challenges, including limited purity, a randomized crystal orientation and the unavoidable presence of lattice water in its structure.

SUMMARY

This section provides a general summary of the disclosure, and is not a comprehensive disclosure of its full scope or all of its features.

The present technology provides for a multilayered structure. The multilayered structure has a substrate and a layer of calcium-doped bronze (Ca:$TiO_2$—B) in direct contact with the substrate. In certain embodiments, the substrate may be a perovskite material, such as strontium titanate (SrTiO$_3$). In other embodiments, the substrate may be a non-perovskite material, such as silicon (Si) that is modified with a layer of a perovskite material. In some embodiments, the multilayered structure further comprises a layer of pure bronze ($TiO_2$—B) deposited on the layer of Ca:$TiO_2$—B.

In other aspects, the present technology also provides for a multilayered structure that includes a substrate comprising a perovskite material, a layer of calcium-doped bronze (Ca:$TiO_2$—B) in direct contact with the substrate, and a layer comprising titania-bronze ($TiO_2$—B) in direct contact with the layer of Ca:$TiO_2$—B. The layer of Ca:$TiO_2$—B is positioned between the substrate and the layer of $TiO_2$—B.

Additionally, the present technology provides for a method for manufacturing a multilayered structure. The method includes depositing a layer of calcium-doped bronze (Ca:$TiO_2$—B) onto the substrate by pulsed laser deposition (PLD) of calcium titanium oxide (CaTi$_4$O$_9$) target onto a substrate. In certain aspects, the PLD comprises laser ablating the CaTi$_4$O$_9$ target to generate the Ca:$TiO_2$—B. In various embodiments, the substrate comprises a perovskite material selected from a group consisting of: SrTiO$_3$, BaTiO$_3$, MgSiO$_3$, CaTiO$_3$, FeTiO$_3$, LaMnO$_3$, PbTiO$_3$, and mixtures thereof. In other embodiments, the method also includes depositing a layer of pure bronze ($TiO_2$—B) onto the layer of Ca:$TiO_2$—B by PLD. The PLD performed for depositing a layer of $TiO_2$—B may include laser ablating a pure $TiO_2$ target to generate the $TiO_2$—B.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 6A:
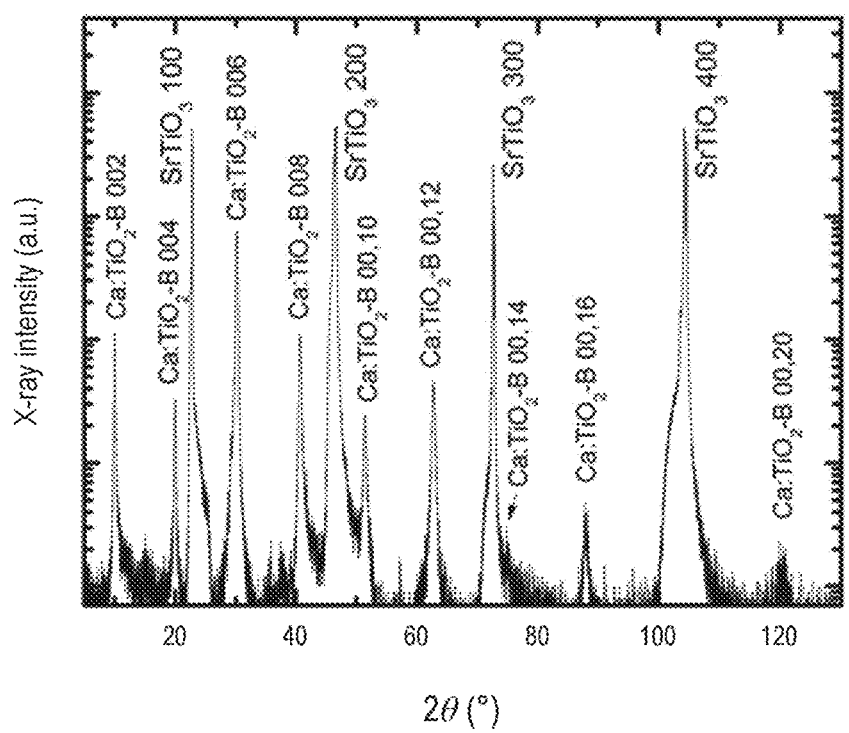
Figure 6B:
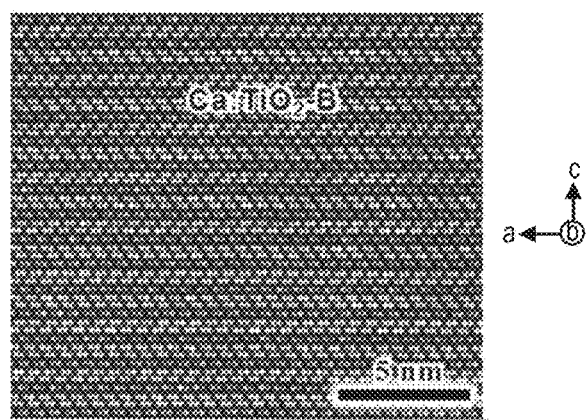
Figure 6C:
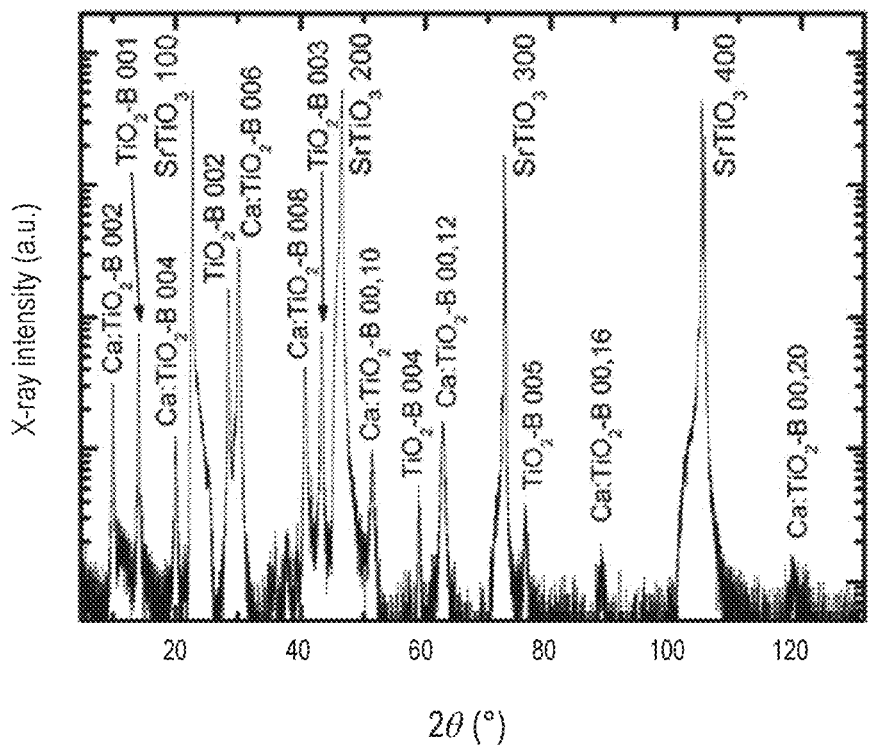
Figure 6D:
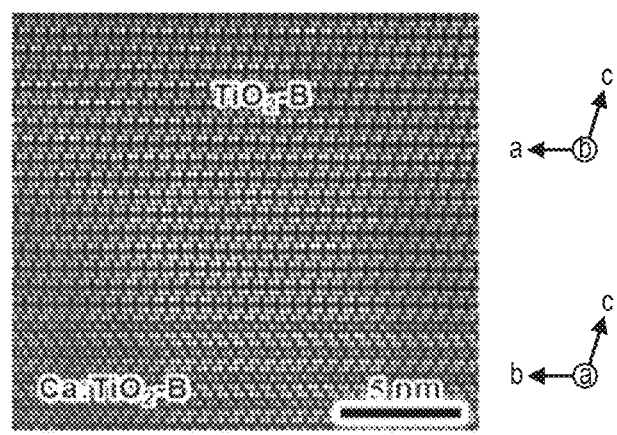
Figure 7A:
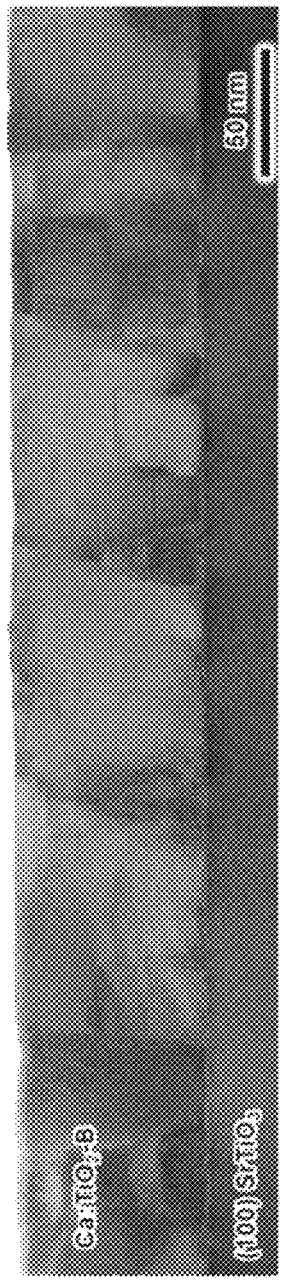
Figure 7B:
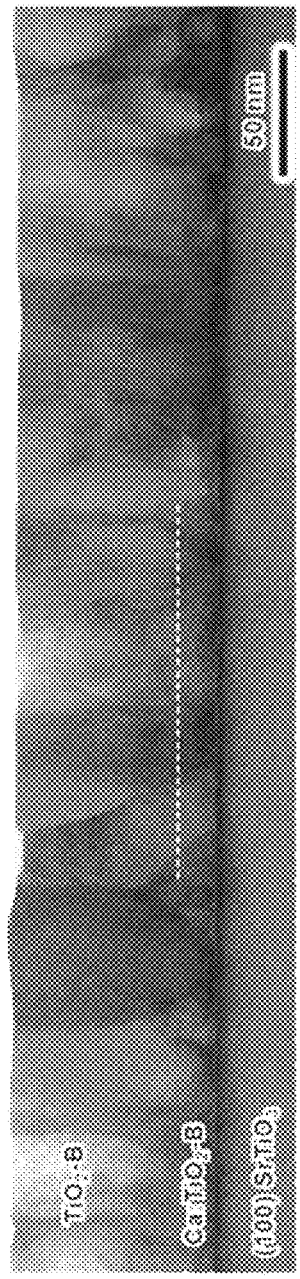
Figure 8A:
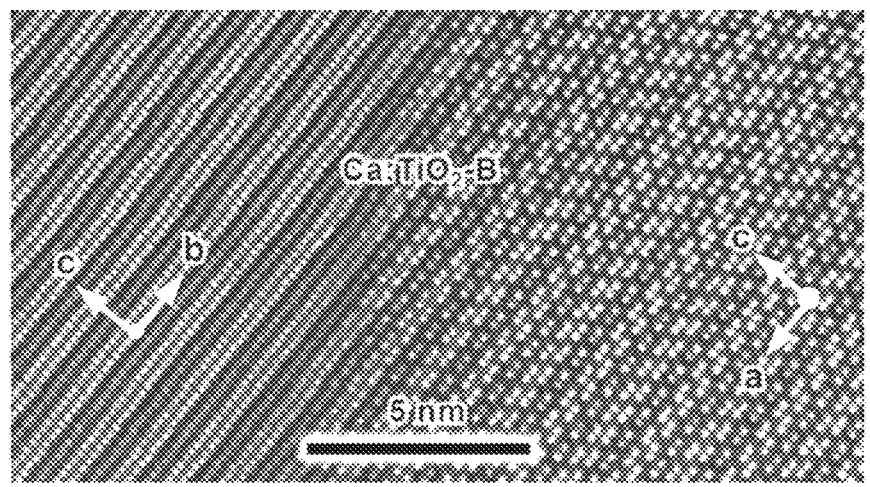
Figure 8B:
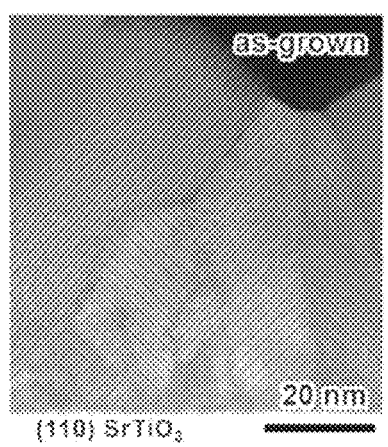
Figure 8C:
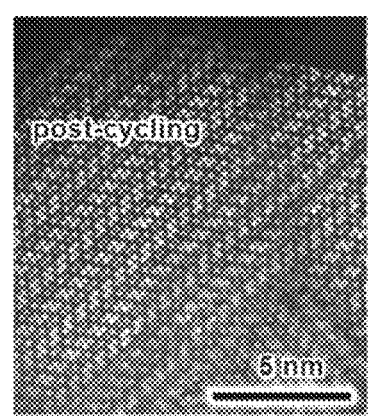
Figure 8D:
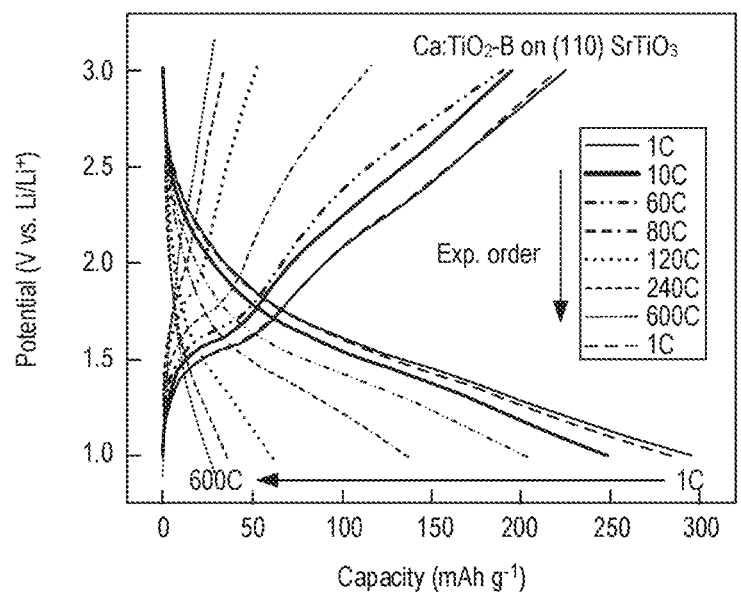
Figure 8E:
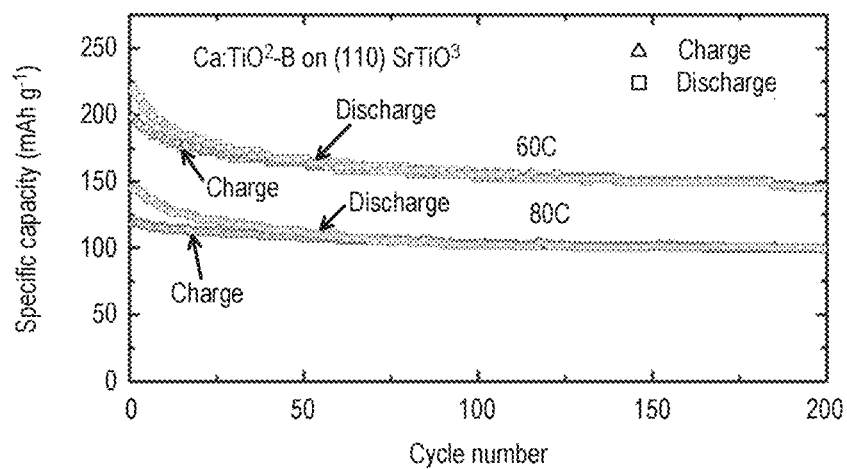
Figure 9:
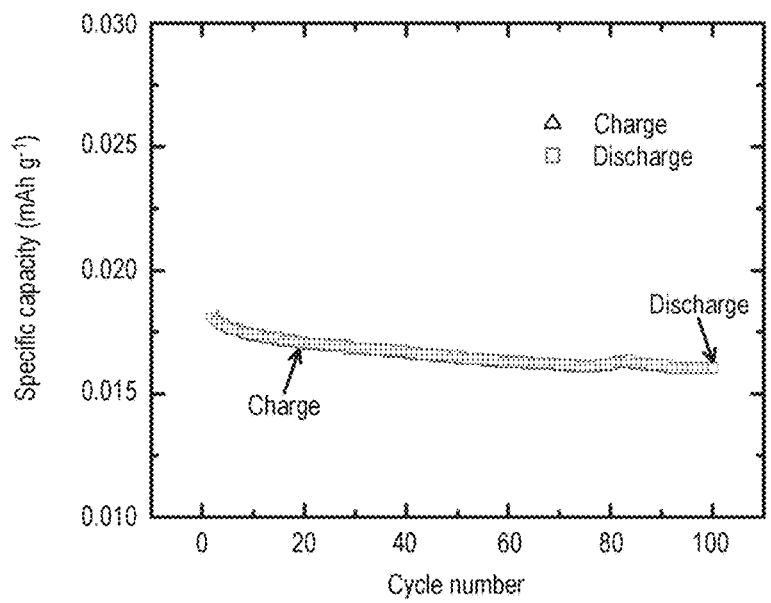
Figure 11:
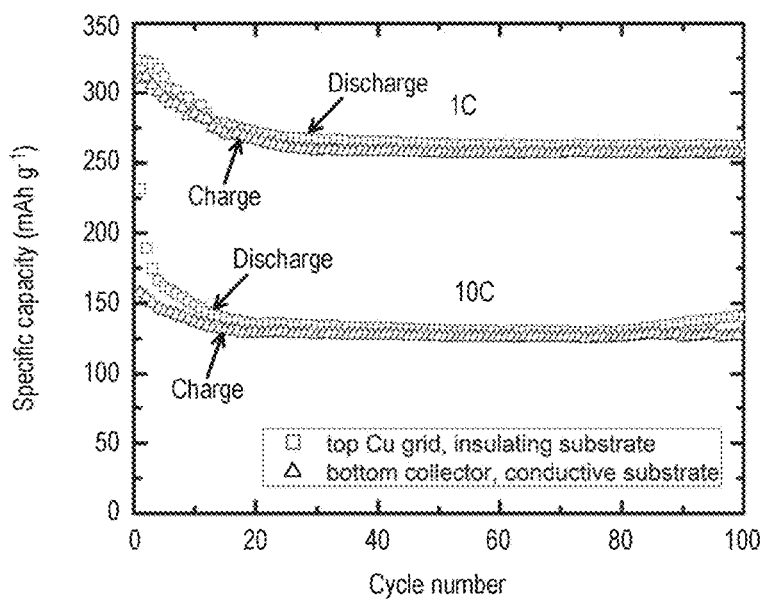
Figure 10A:
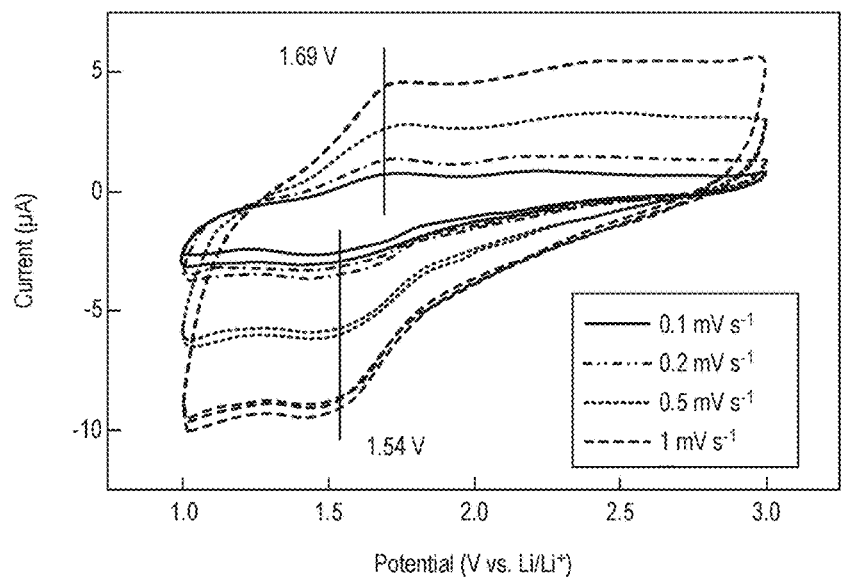
Figure 10B:
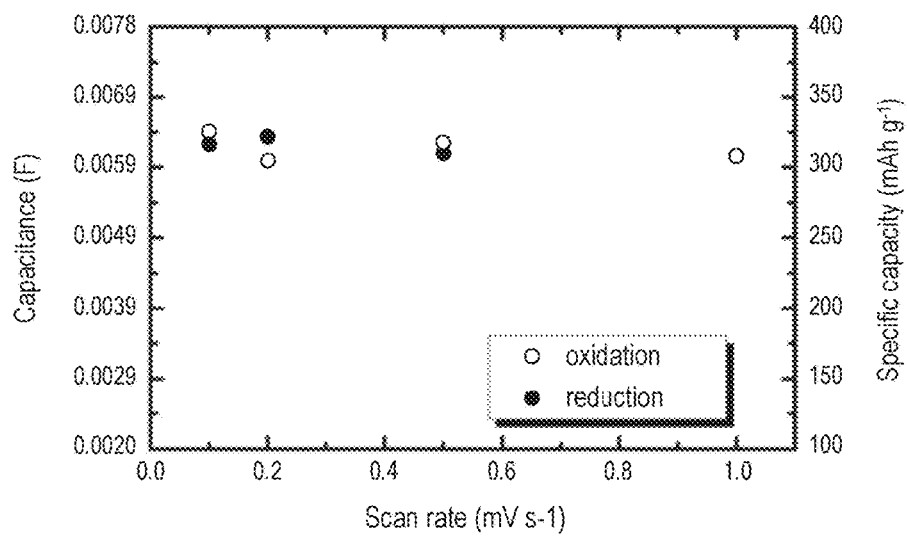
Figure 12A:
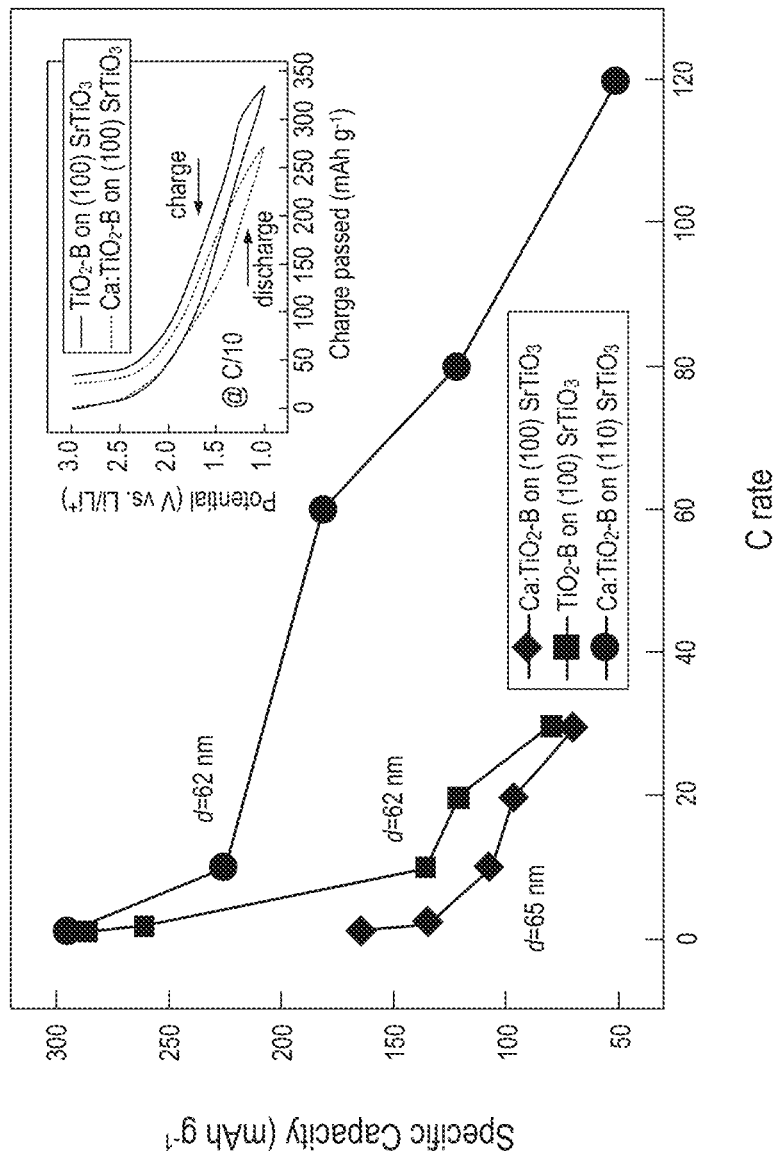
Figure 12B:
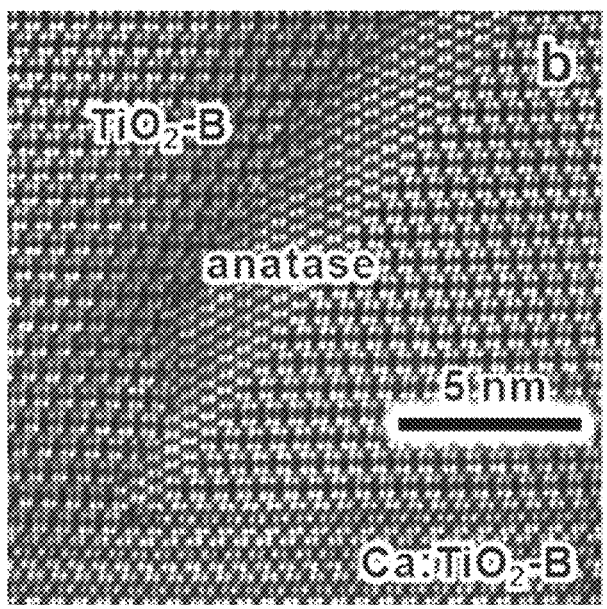
Figure 12C:
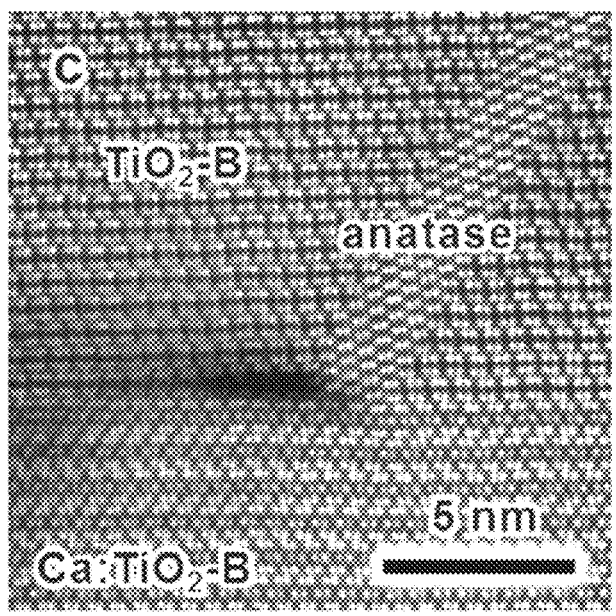
Figure 12D:
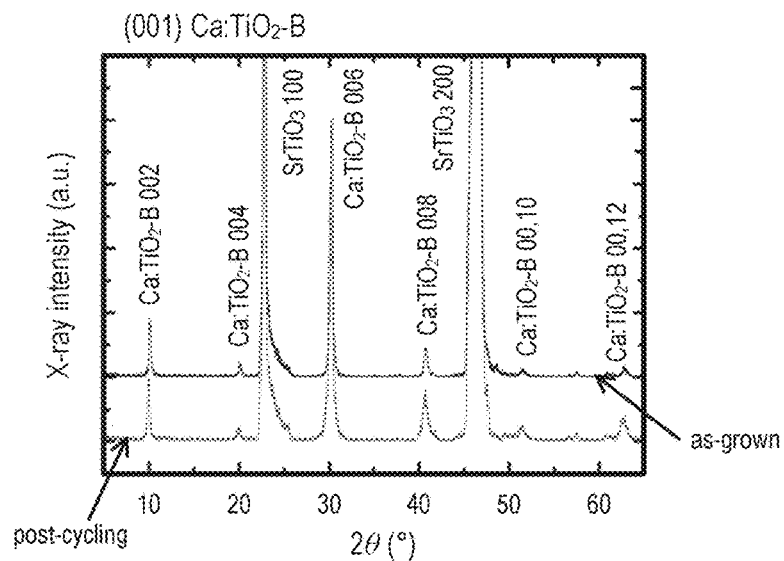
Figure 12E:
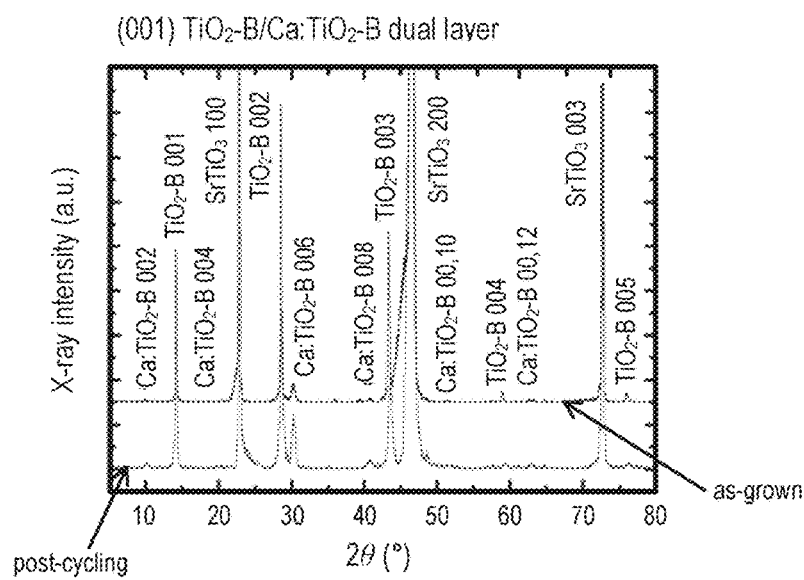
Figure 13B:
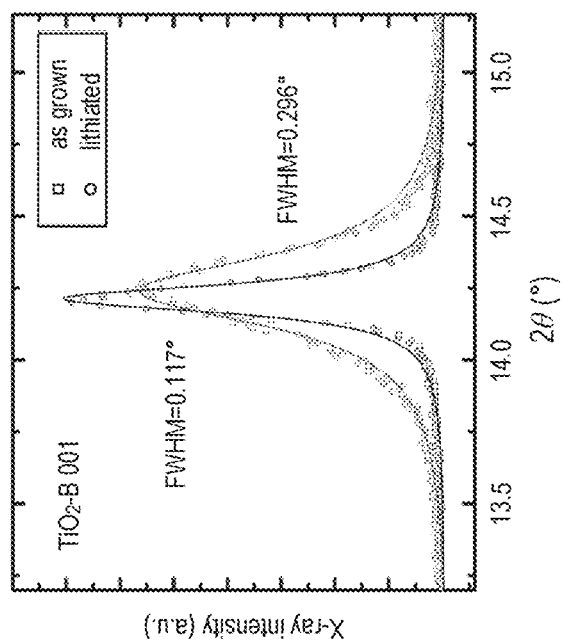
Figure 13A:
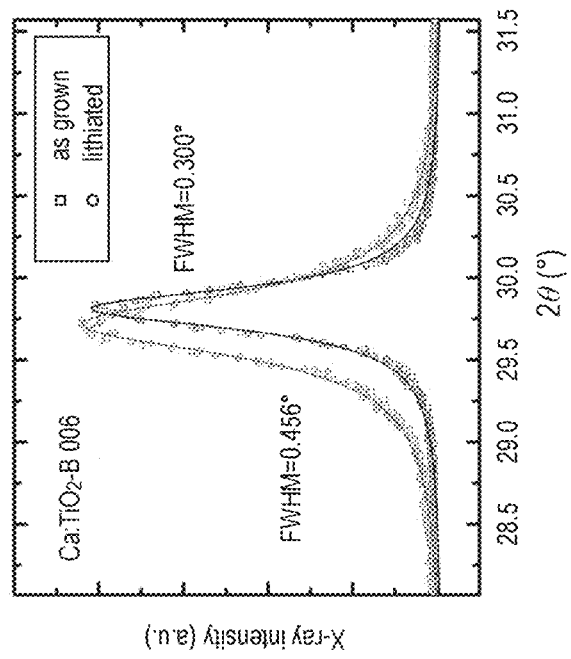
Figure 14:
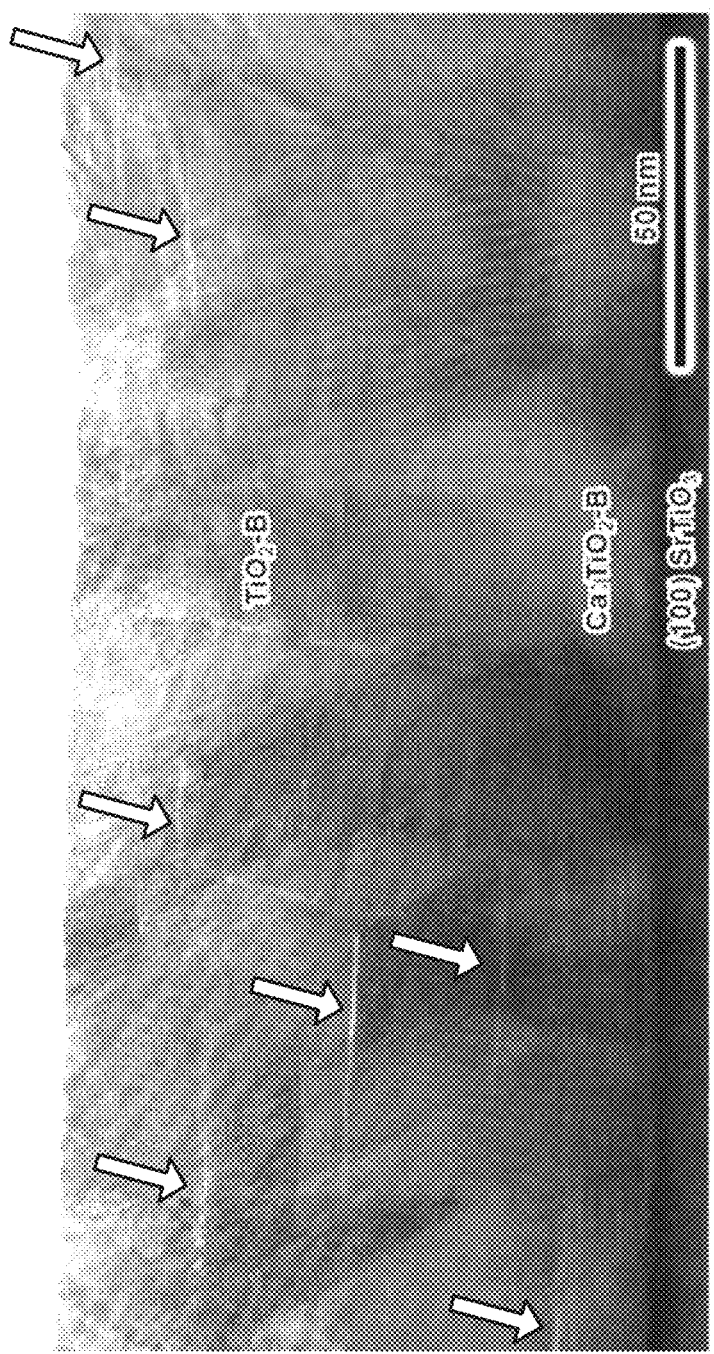
Figure 15:
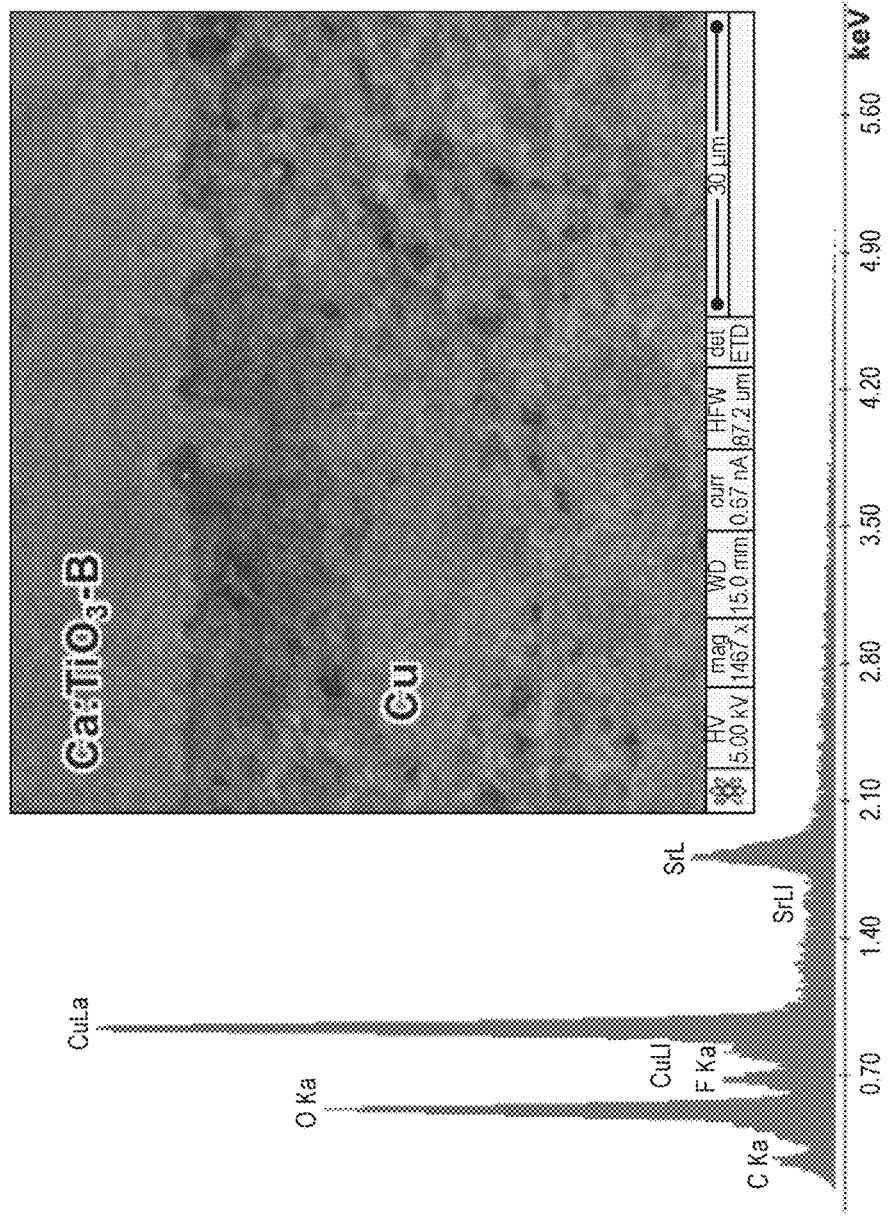
Figure 16:
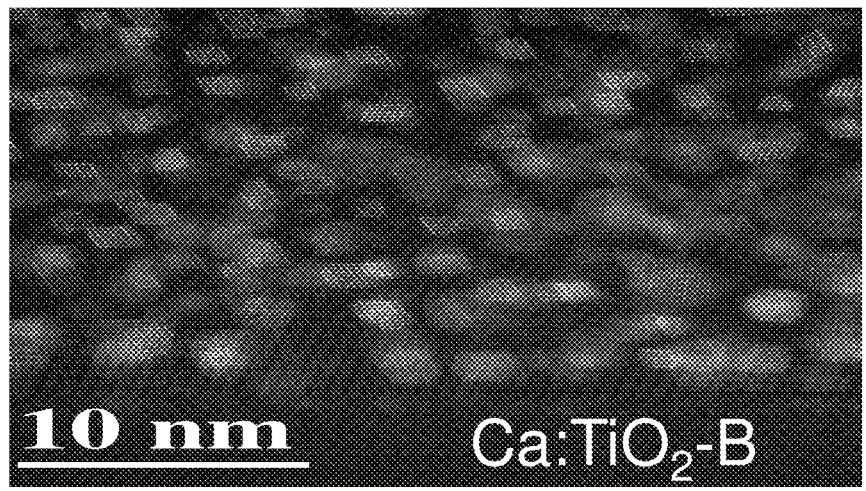
Figure 17A:
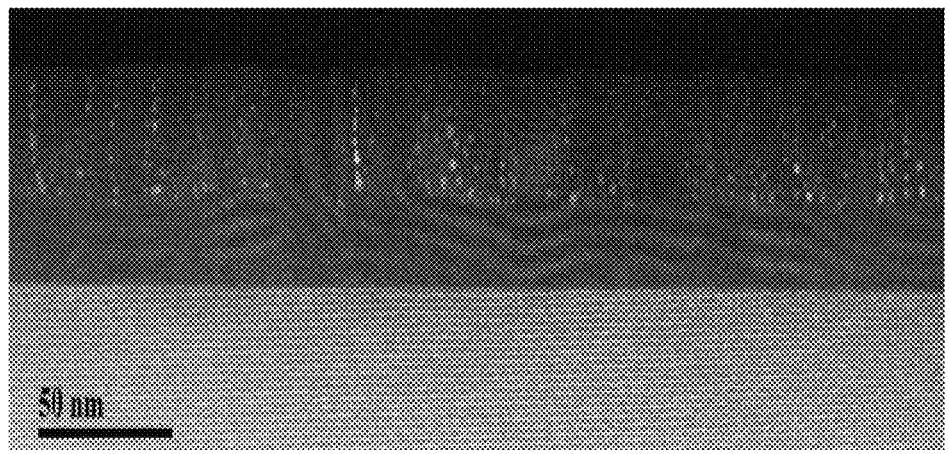
Figure 17B:
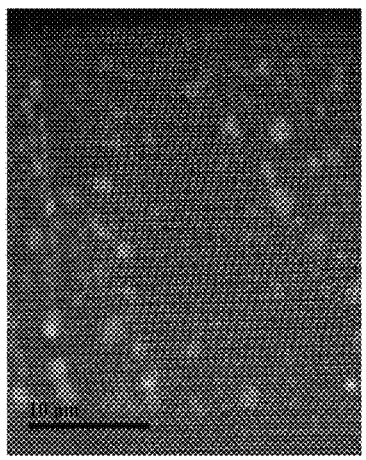
Figure 17C:
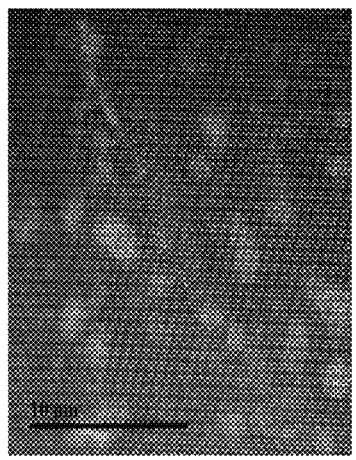
Figure 18:
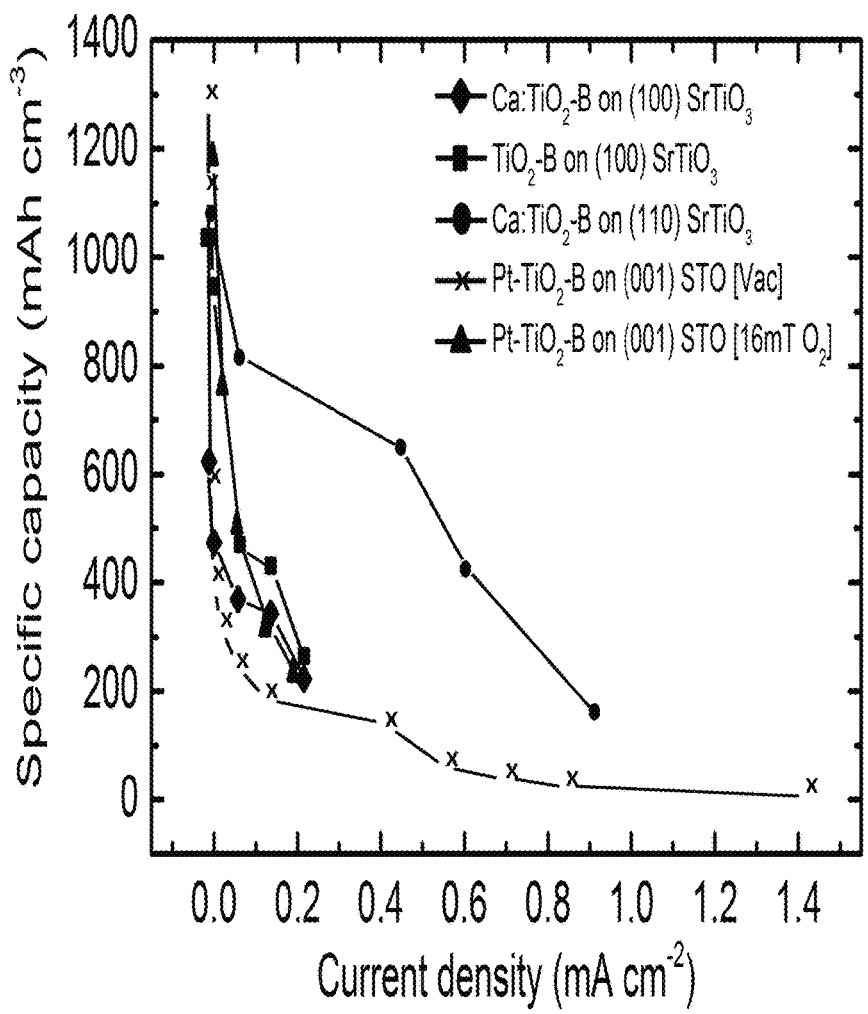

FIGS. 6A-6D show a characterization of Ca:$TiO_2$—B and regular $TiO_2$—B; wherein FIG. 6A is XRD pattern of a Ca:$TiO_2$—B thin film grown on a (100) SrTiO$_3$ substrate at 800° C. by pulsed laser deposition (PLD) and the heteroepitaxial relationship is $[100](001)_{Ca:TiO2-B}\|[100](001)_{Sr:TiO3}$, FIG. 6B is a HAADF STEM image of the Ca:$TiO_2$—B phase, FIG. 6C is an XRD pattern of a regular $TiO_2$—B thin film grown on top of a thin Ca:$TiO_2$—B template layer on a (100) SrTiO$_3$ substrate under the same PLD conditions, and FIG. 6D is a HAADF STEM image of the dual layer structure;

FIGS. 7A-7B show as-grown morphology of both a Ca:$TiO_2$ thin film and a $TiO_2$—B/Ca:$TiO_2$—B dual layer film on (100) SrTiO$_3$ substrate, wherein FIG. 7A is a low magnification STEM image of a Ca:$TiO_2$—B film with about 75 nm thickness, and FIG. 7B is a low magnification STEM image of a $TiO_2$—B film (about 65 nm) grown on top of a thin Ca:$TiO_2$—B template layer (about 15 nm), wherein the dash line was drawn to locate the interface;

FIGS. 8A-8E show the structure and electrochemical performance of an inclined Ca:$TiO_2$—B film grown on a (110) SrTiO$_3$ substrate, wherein FIG. 8A is a HAADF STEM image of a region near a grain boundary, FIG. 8B is a lower magnification STEM image showing the polycrystalline nature of the film, wherein different grains have channels along different directions exposed at the surface, FIG. 8C is a HAADF STEM image showing a region near the surface after aggressive cycling for more than 60 days, wherein no significant structural degradation, either on the surface or in the film, is observed, FIG. 8D shows charge-discharge voltage profiles of the 5th cycle at each current rate from 1 C to 12000 C (1 C=335 mA g$^{-1}$), wherein dashed lines depict the profiles at 1 C immediately following the last cycle at 12000 C, and FIG. 8E shows capacity retention at constant 60 C and 80 C rates for 200 cycles in a voltage window of 1-3 V;

FIG. 9 is a graph showing cycling performance of a bare Nb:SrTiO$_3$ (100) substrate at a 1 C rate for 100 cycles in a voltage window of 1-3 V versus Li metal;

FIGS. 10A-10B show film characterizations, wherein FIG. 10A is a graph showing cyclic voltammograms (CVs) of a (001) $TiO_2$—B thin film using the top Cu grid current collector at different scan rates, wherein three cycles are shown for each rate, demonstrating good repeatability of the measurement, wherein signature $TiO_2$—B peaks were observed, and FIG. 10B is a graph showing a specific capacitance calculated by integrating the CVs at different scan rates for both the oxidation and reduction curves;

FIG. 11 is a graph showing a comparison of discharge capacities of a $TiO_2$—B thin film using two different test configurations, wherein capacity contribution from a Ca:$TiO_2$—B template layer is subtracted in both configurations, and capacity of the conductive Nb:$SrTiO_3$ substrate was subtracted for the bottom collector configuration;

FIGS. 12A-12E depict a rate capability comparison and structural change after cycling, wherein FIG. 12A is a graph showing a discharge capacity at the 20th cycle of both $TiO_2$—B and Ca:$TiO_2$—B with different orientations at increasing rates, wherein respective film thicknesses are labeled and solid lines are guides for the eyes, the inset of FIG. 12A shows potential profiles at the 5th cycle of (001) $TiO_2$—B and Ca:$TiO_2$—B films at C/10 rate (33.5 mA g$^{-1}$), FIGS. 12B and 12C show before and after cycling structural comparison of a $TiO_2$—B/Ca:$TiO_2$—B dual layer film grown on (100) $SrTiO_3$, wherein a fracture at the interface is clearly seen and such fractures are observed throughout the post-cycling film, and FIGS. 12D and 12E are XRD patterns before and after cycling of both a Ca:$TiO_2$—B film and a $TiO_2$—B/Ca:$TiO_2$—B dual layer film on (100) $SrTiO_3$;

FIGS. 13A-13B show lattice changes due to Li$^+$ intercalation generated by XRD fine scans of (001) bronze films grown on (100) $SrTiO_3$ substrates, wherein solid curves are fittings of the experimental data, and wherein FIG. 13A is a 006 peak of a Ca:$TiO_2$—B film with a peak position shift indicating an increase of c and a peak broadening (FWHM: full width at half maximum) were observed, and FIG. 13B shows a $TiO_2$—B 001 peak of a $TiO_2$—B/Ca:$TiO_2$—B dual layer film with a peak position shift indicating a slight decrease of c, and a peak broadening were observed;

FIG. 14 shows fractures throughout a film caused by charging and discharging, wherein a lower magnification STEM image of the same sample as in FIG. 12C shows more fractures in the $TiO_2$—B/Ca:$TiO_2$—B dual layer film after cycling, wherein the arrows point to some of the fractures;

FIGS. 15A-15B show a Cu grid surface at a charged state. FIG. 15A is a scanning electron microscopy image showing the surface of the Cu wire on the same Ca:$TiO_2$—B thin film as in FIGS. 8A-8C, the film being fully charged with Li$^+$ at the rate of 1000 C, and removed from the cell at a half cycle to be examined and no obvious Li plating was observed, and FIG. 15B shows an X-ray energy dispersive spectrum taken on the Cu wire, wherein carbon and fluorine are from the residue of LiPF$_6$ electrolyte;

FIG. 16 shows an image of a multilayered stack having a Pt—$TiO_2$—B layer and a Ca:$TiO_2$—B layer;

FIGS. 17A-17C show images of a multilayered stack having a $SrTiO_3$ substrate, a layer of Ca:$TiO_2$—B disposed on the substrate, and a layer of Pt—$TiO_2$—B positioned on the Ca:$TiO_2$—B layer, where FIGS. 17B and 17C are magnified images of FIG. 17A; and FIG. 18 is a chart showing comparative electrochemical performance (specific capacity (mAh/cm$^2$) versus current density (mA/cm$^2$)) for comparative electrochemical devices including those having thin layers with platinum (e.g., a first film of Pt—$TiO_2$—B on (001) $SrTiO_3$ formed under vacuum conditions and a second film of Pt—$TiO_2$—B on (001) $SrTiO_3$ formed with 16 mTorr of oxygen) and thin layers without platinum (e.g., Ca:$TiO_2$—B on (100) $SrTiO_3$, $TiO_2$—B on (100) $SrTiO_3$, and Ca:$TiO_2$—B on (110) $SrTiO_3$).

Corresponding reference numerals indicate corresponding parts throughout the several views of the drawings.

DETAILED DESCRIPTION

Example embodiments will now be described more fully with reference to the accompanying drawings.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments. Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the stated numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

As referred to herein, ranges are, unless specified otherwise, inclusive of endpoints and include disclosure of all distinct values and further divided ranges within the entire range. Thus, for example, a range of "from A to B" or "from about A to about B" is inclusive of A and of B. Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

Titania ($TiO_2$; also referred to as titanium dioxide) has various polymorphs, which all have different crystallographic properties. The polymorphs include anatase, rutile, brookite, and bronze ($TiO_2(B)$). As used herein, the bronze polymorph of titania is referred to as "bronze", "titania bronze" or "$TiO_2$—B", wherein "$TiO_2$" represents titania and "B" represents the "bronze" polymorph. Where $TiO_2$—B does not contain any dopants or impurities, it may be referred to as "pure $TiO_2$—B" or "pure bronze".

In various aspects, the present disclosure provides a calcium-doped titania-bronze material. Titania bronze is a polymorph of titania ($TiO_2$), which when doped with calcium becomes a novel calcium-doped titania bronze (Ca:$TiO_2$—B) material. In certain aspects, the present disclosure provides an entirely waterless method of producing phase-pure $TiO_2$—B in single-crystalline thin films. Such thin film materials have vast applications, including in solar energy conversion, thermoelectrics, photocatalysis, water splitting, and sensors, by way of non-limiting example.

The current technology contemplates a new material, calcium doped bronze (Ca:$TiO_2$—B; $CaTi_5O_{11}$). Further, the current technology provides a new waterless process to synthesize hetero-epitaxial crystalline thin films, e.g., comprising Ca:$TiO_2$—B or $TiO_2$—B, by using pulsed laser deposition (PLD). In certain aspects, by aligning open channels to out-of-plane directions, extremely high rates of lithium ion transport, up to 12000 C, with extraordinary structural stability can be achieved. As used herein, aligning the open channels to "out-of-plane" directions means aligning the channels in a three dimensional space at an angle from a surface of a substrate or thin film, as opposed to being aligned parallel to a surface of a substrate or thin film. The current technology contemplates forming and utilizing $TiO_2$—B single crystals. As noted above, materials prepared in accordance with certain variations of the present technology provide new Ca:$TiO_2$—B and $TiO_2$—B materials, which are suitable for use in a variety of applications, including as negative electrode materials in LIBs, solar energy conversion, thermoelectrics, photocatalysis, water splitting and sensors.

$TiO_2$ has been extensively investigated as an anode material for LIBs due to its low cost, minimal environmental impact, structural stability, high theoretical capacity (335 mA h $g^{-1}$) and inherent safety (a buffer >1.5 V before lithium plating). Fast lithium storage has been demonstrated in anatase, rutile and $Li_4Ti_5O_{12}$ nanostructures. Although known to have advantages over anatase or rutile, high quality bronze phase titania ($TiO_2$—B) specimens that demonstrate good electrochemical properties thus far have exclusively been nano-structured powders prepared by hydrothermal methods, as first synthesized in 1980. Being a metastable phase, compounded by the fact that $TiO_2$-anatase rarely fully reacts and is often used as a precursor in existing synthesis methods, phase pure $TiO_2$—B has been extremely difficult to obtain, obscuring the interpretation of property testing results. In addition, removal of all $H_2O$, which could interfere with $Li^+$ transport, from the final product is quite difficult, and recent studies have suggested that the presence of $H_2O$ may be needed to keep phase pure $TiO_2$ from collapsing into anatase upon aggressive heating.

The present technology uses Ca to stabilize the bronze structure without the presence of $H_2O$, forming a new variant phase Ca:$TiO_2$—B, and by using Ca:$TiO_2$—B as a template layer or buffer layer, epitaxial $TiO_2$—B single-crystalline thin films may be synthesized by PLD, which is a completely waterless process. Significant enhancement in battery performance is achieved by exploiting this epitaxial relationship with the substrate. The ability to accurately control the crystal orientation is especially beneficial to studies focused on surface states, such as in photocatalysis and photovoltaic applications.

Figure 1:
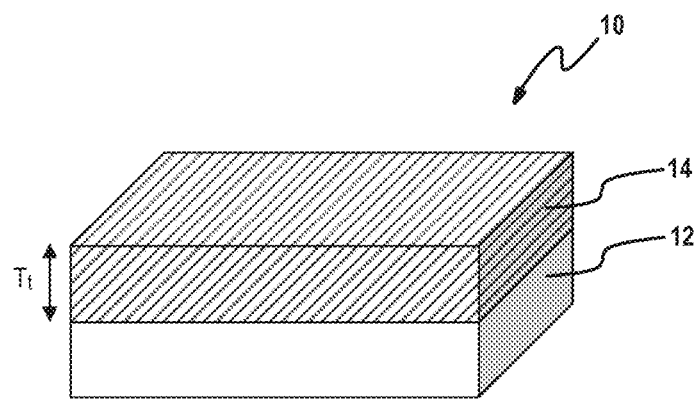
FIG. 1 shows a perspective view of a first multilayered structure.

With reference to FIG. 1, the present technology provides for a first multilayered structure 10 comprising a substrate 12 and a template layer or buffer layer 14 in direct contact with the substrate 12. The substrate 12 can be composed of any organic or inorganic material commonly used in the art, including crystalline and non-crystalline conductive materials. Non-limiting examples of substrate materials include plastics, polymers, oligomers, metals, silicon (Si), silica (silicon dioxide or silicon oxide,), aluminum oxide, sapphire, germanium, $Al_2O_3$, $MgAl_2O_4$, GaP, Ge, InAs MgO, GaAs, silicon carbide, gallium phosphide, gallium nitride, indium phosphide, zinc oxide, aluminum nitride, bismuth germanate, or oxides, nitrides, metals or alloys thereof. In some embodiments, the substrate 12 comprises a perovskite material. In other embodiments, the substrate consists of a perovskite material. As used herein, a "perovskite" material comprises molecules with a perovskite structure having the formula $ABX_3$, where A and B are cations of different sizes and X is an anion that bonds to both cations. Non-limiting examples of molecules with perovskite structures include $SrTiO_3$, $BaTiO_3$, $MgSiO_3$, $CaTiO_3$, $FeTiO_3$, $LaMnO_3$, $PbTiO_3$, and combinations thereof. In various embodiments, the substrate 12 is composed of SrTiO$_3$, (100) SrTiO$_3$, (110) SrTiO$_3$. In other embodiments, the substrate 12 is a material comprising a dopant, such as a doped SrTiO$_3$, doped (100) SrTiO$_3$, or doped (110) SrTiO$_3$. Non-limiting examples of suitable dopants include Nb, V, Ru, Rh, Mn, Pd, Ir, and Pt. As a non-limiting example, the substrate can be SrTiO$_3$ doped with Nb (Nb:SrTiO$_3$). In embodiments where there substrate 12 does not comprise a perovskite material, such as where the substrate 12 comprises Si, the substrate 12 is modified by with a layer of a perovskite material that serves as a template for the template layer 14. The perovskite material can be any perovskite oxide described herein. As a non-limiting example, a Si substrate can be modified with a layer of SrTiO$_3$, which is thereby positioned between the substrate 12 and the template layer 14.

In some embodiments, the template layer 14 comprises Ca:TiO$_2$—B. In other embodiments, the template layer 14 consists of Ca:TiO$_2$—B. The template layer has a thickness T$_1$ of greater than or equal to about 1 nm to less than or equal to about 500 nm. The multilayered stack 10 comprising the substrate 12 and template layer 14 can be included in an electrical device without additional films deposited on the template layer 14. However, in some embodiments, not shown in FIG. 1, the multilayered structure 10 further comprises additional layers or films deposited on top of the template layer 14. The additional layers can be electronically active layers or insulating layers.

Figure 2:
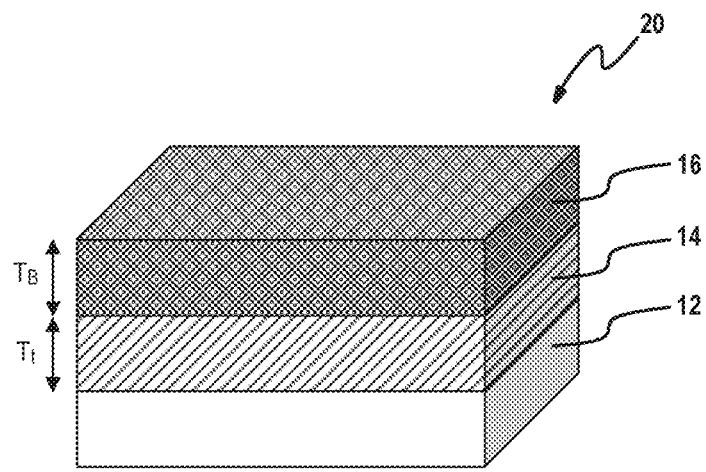
FIG. 2 shows a perspective view of a second multilayered structure.

A second multilayered structure 20 is shown in FIG. 2. The multilayered structure 20 has the same substrate 12 and template layer 14 as the first multilayered structure 10 shown in FIG. 1. However, the second multilayered structure 20 further comprises a TiO$_2$—B layer 16 comprising TiO$_2$—B. In some embodiments, the TiO$_2$—B layer 16 consists of TiO$_2$—B. In other variations, the TiO$_2$—B 16 layer may comprise electrically conductive nanoparticles or electrically conductive materials. The TiO$_2$—B layer 16 is in direct contact with the template layer 14. A near-perfect lattice match between the surface structures of the template layer 14 and the TiO$_2$—B layer 16 provides for a high stability and efficient Li$^+$ transport between the layers 14, 16. As used herein, a "near-perfect lattice match" means the interatomic periodic spacing of the template layer's lattice structure is about the same as the interatomic periodic spacing of the TiO$_2$—B layer's lattice structure at their interface. The TiO$_2$—B layer 16 has a thickness T$_B$ of from about 1 nm to about 1000 nm. In some embodiments, the TiO$_2$—B layer 16 has a thickness T$_B$ of from about 50 nm to about 200 nm. As in the first multilayered structure 10, the substrate 12 of the second multilayered structure 20 is modified with a layer comprising a perovskite material, such as a perovskite oxide, when the substrate 12 does not comprise a perovskite structure. In some embodiments, not shown in FIG. 2, the multilayered structure 20 further comprises additional layers or films deposited on top of the TiO$_2$—B layer 16. The additional layers can be electronically active layers or insulating layers.

In various embodiments, such as for LIBs, the first and second multilayered structures 10, 20 may be incorporated into an electrochemical cell assembly. In such a variation, the device has first and second multilayered structures 10, 20 that further comprise a wire grid, a separator layer or membrane, a counter electrode, a nonaqueous electrolyte, and a casing, such as a stainless steel cell casing. The wire grid is composed of any conducting material commonly used in the art, such as, for example, copper, gold or platinum. The separator is composed of any material commonly used in the art for battery separators, such as, for example, nonwoven fibers, polymer films, and naturally occurring substances. Non-limiting examples of nonwoven fibers include cotton, nylon, polyesters, and glass; non-limiting examples of polymer films include polyethylene, polypropylene, poly(tetrafluoroethylene), and polyvinyl chloride; and non-limiting examples of naturally occurring substances include rubber, asbestos, and wood. In various embodiments, the multilayered structures 10, 20 are incorporated in a half-cell, wherein the counter electrode is an anode and the Ca:TiO$_2$—B and/or the TiO$_2$—B are the cathode. In a half cell, the anode is a metal layer, such as, for example, Li metal, Na metal, K metal, or Mg metal, as non-limiting examples. In other embodiments, the multilayered structures 10, 20 are incorporated in a full-cell, wherein the Ca:TiO$_2$—B and/or the TiO$_2$—B are an anode, and the counter electrode is a cathode comprising a material with a higher potential than the Ca:TiO$_2$—B and/or the TiO$_2$—B anode, such as, for example, LiCoO$_2$, LiNi$_{0.5}$Mn$_{1.5}$O$_4$, or LiFePO$_4$. The non-aqueous electrolyte may comprise a lithium salt in an organic solvent, such as ethylene carbonate, dimethyl carbonate, diethyl carbonate, and combinations thereof as non-limiting examples. Non-limiting examples of the lithium salt include LiPF$_6$, LiBF$_4$ and LiClO$_4$.

With further reference to FIGS. 1 and 2, in certain other embodiments, a plurality of conductive nanoparticles may be embedded in or otherwise distributed throughout the template layer 14 and/or in the TiO$_2$—B layer 16. Embedding or otherwise distributing conductive nanoparticles, for example, in the TiO$_2$—B layer 16 can significantly improve the electrical conductivity of the TiO$_2$—B layer, which results in enhanced performance when used in a battery or other electrochemical device relative to a battery or other electrochemical device lacking conductive nanoparticles. A TiO$_2$—B layer comprising conductive nanoparticles is also useful for photocatalysis water splitting applications.

In certain variations, the conductive nanoparticles may have a particle size (an average diameter for the plurality of nanoparticles present) of greater than or equal to about 10 nm to less than or equal to about 100 nm. The conductive nanoparticles may be formed of a variety of conductive materials including metallic, semiconducting, ceramic, and/or polymeric nanoscale particles having plurality of shapes. In certain variations, the nanoparticles may comprise conductive metal materials like platinum, gold, silver, copper, aluminum, nickel, iron, cadmium, mercury, lead, molybdenum, iron, and alloys or compounds thereof. Particularly suitable nanoparticles comprise platinum. In other alternative variations, suitable conductive nanoparticles can be exemplified by, but are not limited to, graphene/graphite, carbon (such as carbon nanotubes, like single walled nanotubes (SWNTs) or multi-walled nanotubes (MWNTs)), silicon, seedling metals, CdTe, CdSe, CdS, HgTe, HgSe, HgS, PbTe, PbSe, PbS, MoS$_2$, FeS$_2$, FeS, FeSe, WO$_{3-x}$, and other similar materials known to those of skill in the art.

Platinum is a particularly suitable conductive material for use as a nanoparticle for the generation of platinum containing TiO$_2$—B (Pt—TiO$_2$—B). For example, Pt—TiO$_2$—B may be used as a template layer 14, on top of which is positioned a layer of TiO$_2$—B 16, or the Pt may be embedded in the TiO$_2$—B layer 16 to generate a Pt—TiO$_2$—B layer 16 adjacent to a template layer 14 comprising Ca:TiO$_2$—B.

The nanoparticles may vary in concentration within the layer from a first surface of a conductive nanoparticle-containing TiO$_2$—B material layer to a second opposing surface of the conductive nanoparticle-containing TiO$_2$—B material layer. For example, in some embodiments, a concentration gradient is formed, where a relative concentration of conductive nanoparticles increases from the first surface to the second opposing surface of the conductive nanoparticle-embedded $TiO_2$—B layer. In other embodiments, the relative concentration of conductive nanoparticles in the layer may decrease from the first surface to the second opposing surface of the conductive nanoparticle-embedded $TiO_2$—B material layer. In yet other embodiments, there is a relatively low concentration of the conductive nanoparticles near the first surface and second opposing surface and a relatively high concentration of the conductive nanoparticles between the first and second and second opposing surface of the conductive nanoparticle-embedded $TiO_2$—B layer.

Figure 3:
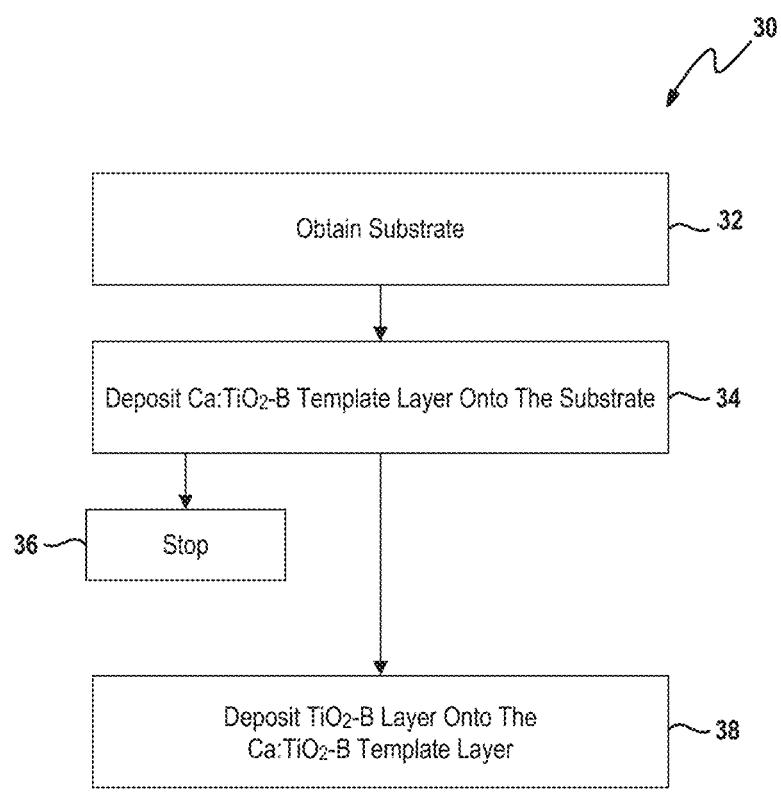
FIG. 3 is a flow chart showing a method for fabricating a multilayer structure according to certain aspects of the present disclosure.

With reference to FIG. 3, the present technology also provides a method 30 for producing the multilayered structures 10, 20. As shown in box 32, the method comprises obtaining a substrate. The substrate can be any substrate described above in regard to the current technology. Accordingly, the substrate may comprise a perovskite material or a non-perovskite material modified by a perovskite material. For example, in various embodiments, the substrate comprises silicon (Si), which may be modified with a perovskite material, such as $SrTiO_3$, or other perovskite oxide, by methods known in the art, such as by molecular-beam epitaxy (MBE). As a non-limiting example, modifying a Si wafer substrate with $SrTiO_3$ comprises depositing half a monolayer (ML=$6.8 \times 10^{14}$ atoms/cm$^2$) of strontium on a clean Si (001) surface at a substrate temperature of about 700° C. The wafer is then cooled to near room temperature where an additional ½ ML of strontium is deposited under ultra-high vacuum (UHV). Oxygen is then introduced and additional strontium is deposited in the presence of the oxygen to form a total of 3 crystalline SrO MLs. On top of the 3 MLs of crystalline SrO, 2 ML of amorphous $TiO_2$ is deposited in oxygen with the substrate temperature still near room temperature (under 200° C.). The resulting heterostructure is then annealed in UHV at equal to or greater than about 450° C. to equal to or less than about 550° C. to recrystallize a $SrTiO_3$ layer 2.5 unit cell thick. Further growth of the epitaxial $SrTiO_3$ layer to a desired film thickness can be achieved on the recrystallized 2.5 unit-cell-thick $SrTiO_3$ template layer through the repeated co-deposition (Sr+Ti+$O_2$ molecular beams) of an amorphous $SrTiO_3$ layer near room temperature, followed by recrystallization in UHV. Such a method is reported by Mi et al., "Atomic structure of the interface between $SrTiO_3$ thin films and Si (001) substrates," Appl. Phys. Lett. 93, 101913 (2008), which is incorporated herein by reference in its entirety.

As shown in box 34, the method 30 further comprises depositing a Ca:$TiO_2$—B template layer onto the substrate. According to the method 30, the Ca:$TiO_2$—B is grown from a calcium titanium oxide (CaTi$_4$O$_9$) target, which may be made by preparing a mixture comprising 50%-90% (wt) $TiO_2$ powder and 10%-50% (wt) CaO powder or 10%-50% (wt) CaTiO$_3$ powder, sintering the mixture at a temperature from about 1000-2000° C. to generate a powdered material, and pressing the powdered material into a pellet under from about 5000-15,000 lbs of force to generate the CaTi$_4$O$_9$ target. In one embodiment, the Ca:$TiO_2$—B is grown from a CaTi$_4$O$_9$ target made by preparing a mixture comprising 80% (wt) $TiO_2$ and 20% (wt) CaO powders, sintering the mixture at about 1400° C. to generate a powdered material, and pressing the powdered material into a pellet under 10,000 lbs of force. The Ca:$TiO_2$—B template layer is deposit by PLD in a vacuum chamber with a base pressure of <$10^{-7}$ Torr. Ca:$TiO_2$—B deposition is performed with an about 200 nm to about 300 nm excimer laser with a pulse duration of from about 10 ns to about 50 ns, a fluence of from about 2 to about 5 J cm$^{-2}$, a repetition rate of from about 2 Hz to about 20 Hz, and at a substrate-target distance of from about 5 to about 10 cm. Thin Ca:$TiO_2$—B films are deposited at from about 500 to about 1000° C. in an oxygen ambient of from about 0.025 to about 0.075 Torr, at a deposition rate of from about 0.005 Å/pulse to about 0.05 Å/pulse. For example, in one embodiment, Ca:$TiO_2$—B deposition is performed with a 248 nm KrF excimer laser with a pulse duration of 22 ns, a fluence of about 3.4 J cm$^{-2}$, a 10 Hz repetition rate, and a substrate-target distance of 6.35 cm, and thin $TiO_2$—B films are deposited at 800° C. in an oxygen ambient of 0.05 Torr, and at a deposition rate of from about 0.01 Å/pulse to about 0.02 Å/pulse. As shown at 36, the method 30 stops in embodiments where no further layers are desired, or when no $TiO_2$—B layer is desired.

As shown in step 38, in some embodiments the method 30 also comprises depositing a $TiO_2$—B layer onto the Ca:$TiO_2$—B template layer. Depositing the $TiO_2$—B layer onto the Ca:$TiO_2$—B template layer is performed by ablating a pure $TiO_2$ target under the same conditions described above for depositing the Ca:$TiO_2$—B template layer on the substrate. Although PLD is described above, in various embodiments the template layer and layer of pure bronze may be deposited by other techniques, such as sputtering, atomic layer deposition (ALD), chemical vapor deposition (CVD), or by molecular beam epitaxy (MBE).

Embodiments of the present technology are further illustrated through the following non-limiting examples.

Example 1

Methods for Generating Multilayered Stacks and Half-Cells

A CaTi$_4$O$_9$ target used to grow Ca:$TiO_2$—B thin films is made by mixing 80% $TiO_2$ and 20% CaO powders, sintering at 1400° C., and pressing into a pellet under 10,000 lbs of force. A vacuum chamber used for PLD has a base pressure <$10^{-7}$ Torr. A 248 nm KrF excimer laser with a pulse duration of 22 ns and a fluence of ~3.4 J cm$^{-2}$ is used for the deposition at a 10 Hz repetition rate, and the substrate-target distance is set to 6.35 cm. Thin films are deposited at 800° C. in an oxygen ambient of 0.05 Torr. The deposition rate is 0.01-0.02 Å/pulse. Deposited films have thicknesses of 50-200 nm (typical deposition time of 1-4 hours), which are measured by a Veeco Dektak profilometer and confirmed with TEM images. XRD results are obtained on a Rigaku rotating anode diffractometer using Cu Kα radiation. All STEM images are captured on a JEOL 2100F TEM equipped with a spherical aberration corrector. Devices are also made with a film of pure $TiO_2$—B grown on the Ca:$TiO_2$—B film. The pure $TiO_2$—B film is deposited on the Ca:$TiO_2$—B film by the same protocol described above for the Ca:$TiO_2$—B film, but with pure 100% $TiO_2$ as a target instead of CaTi$_4$O$_9$.

Battery half-cells (EL-CELL ECC-STD) are assembled in an argon-filled glove box (Innovative Technology Inert Lab) with $O_2$ and $H_2O$ levels below 2 and 1 ppm, respectively, and tested at room temperature on a Princeton Applied Research VersaSTAT MC 4-channel system operating in galvanostatic mode using a lithium metal anode, a non-aqueous electrolyte (1M LiPF$_6$ in ethylene carbonate:dimethyl carbonate 1:1 (v/v), Merck) and a 1.55 mm thick glass fiber separator. In order to investigate the electrochemical performance of thin films, a current collector is needed, either on top or at the bottom of the film. Conductive $SrTiO_3$ substrates doped with 0.5 at. % Nb (resistivity 0.05 Ωcm) are used as bottom current collectors, and provide similar film quality to those grown on undoped SrTiO$_3$ substrates. Conversely, for films grown on non-conductive SrTiO$_3$ substrates, a top current collection geometry is fabricated using a grid of Cu wires with line width of 100 μm and a thickness of 20 nm which are deposited on the film surface in an E-beam evaporator with a Mo mask. On a 10×10 mm$^2$ test sample, the grid covers <0.8% of the surface area, which has a negligible influence on the Li$^+$ exchange between the film and the electrolyte. Such a configuration is shown schematically in FIG. 4. Although not shown in FIG. 4, some half-cells comprise only the substrate and the Ca:TiO$_2$—B film, and not the pure TiO$_2$—B film.

Results and Characterizations

The CaTi$_5$O$_{11}$ stable phase is discovered in atomic resolution high-angle annular dark-field (HAADF) scanning transmission electron microscopy (STEM) images, according to which a geometric model is built and first-principles optimization are performed by PW91 functional implemented in VASP. More accurate HSE06 method calculations indicate that CaTi$_5$O$_{11}$, or Ca$_4$Ti$_{20}$O$_{44}$ in a unit cell, is an orthorhombic structure with the symmetry of CMCM (63) and lattice constants of a=12.1702 Å, b=3.8013 Å, c=17.9841 Å, α=β=γ=90°. Atom positions are shown in Table 1. The PLD target recipe and the growth conditions, which are detailed above, produce a high quality CaTi$_5$O$_{11}$ thin film deposited onto a (100) SrTiO$_3$ substrate. The crystal structure projected along three crystallographic directions and is compared with the regular TiO$_2$—B structure in FIG. 5. FIG. 6A shows the θ-2θ X-ray diffraction (XRD) pattern for an epitaxial (001) thin film of the CaTi$_5$O$_{11}$ phase. A HAADF STEM image taken along the b direction of the structure is displayed in FIG. 6B, showing an interesting layered, zigzag pattern where every inserted layer of alternating Ti and Ca atoms flips the stacking direction of the next two layers of Ti atoms above it, consistent with the atomic model in FIG. 5. Because it is a variant of the TiO$_2$—B structure with extra Ca layers and superlattice twinning, the new phase is designated as Ca:TiO$_2$—B.

TABLE 1

Atom positions in the Ca:TiO$_2$—B structure

| #  | Atom | | x | y | z |
|----|------|------|---------|---------|---------|
| 1  | O    | O1   | 0.19999 | 0.93727 | 0.34267 |
| 2  | O    | O2   | 0.04096 | 0.93438 | 0.98907 |
| 3  | O    | O3   | 0.23305 | 0.93649 | 0.11333 |
| 4  | O    | O4   | 0.07177 | 0.93646 | 0.21254 |
| 5  | O    | O5   | 0.38543 | 0.93642 | 0.24343 |
| 6  | O    | O6   | 0.7005  | 0.43782 | 0.34213 |
| 7  | O    | O7   | 0.53992 | 0.43719 | 0.98906 |
| 8  | O    | O8   | 0.73327 | 0.43714 | 0.11332 |
| 9  | O    | O9   | 0.57158 | 0.43772 | 0.2121  |
| 10 | O    | O10  | 0.88567 | 0.43771 | 0.24335 |
| 11 | O    | O11  | 0.78487 | 0.9355  | 0.99189 |
| 12 | O    | O12  | 0.94481 | 0.93819 | 0.34546 |
| 13 | O    | O13  | 0.75278 | 0.93744 | 0.22097 |
| 14 | O    | O14  | 0.91413 | 0.93789 | 0.12209 |
| 15 | O    | O15  | 0.6003  | 0.93703 | 0.09083 |
| 16 | O    | O16  | 0.28498 | 0.43691 | 0.9919  |
| 17 | O    | O17  | 0.44504 | 0.43607 | 0.34505 |
| 18 | O    | O18  | 0.25261 | 0.43655 | 0.22121 |
| 19 | O    | O19  | 0.41393 | 0.43555 | 0.1219  |
| 20 | O    | O20  | 0.09999 | 0.43618 | 0.0913  |
| 21 | O    | O21  | 0.23209 | 0.93441 | 0.72099 |
| 22 | O    | O22  | 0.07037 | 0.93436 | 0.62223 |
| 23 | O    | O23  | 0.38436 | 0.93492 | 0.59074 |
| 24 | O    | O24  | 0.73211 | 0.43547 | 0.72103 |
| 25 | O    | O25  | 0.57044 | 0.43497 | 0.62189 |
| 26 | O    | O26  | 0.88417 | 0.43548 | 0.59087 |
| 27 | O    | O27  | 0.75136 | 0.93542 | 0.61322 |
| 28 | O    | O28  | 0.2515  | 0.43522 | 0.61321 |
| 29 | O    | O29  | 0.41305 | 0.43458 | 0.71227 |
| 30 | O    | O30  | 0.0992  | 0.43408 | 0.74361 |
| 31 | O    | O31  | 0.91301 | 0.93537 | 0.71234 |
| 32 | O    | O32  | 0.59921 | 0.93577 | 0.74336 |
| 33 | O    | O33  | 0.94383 | 0.9365  | 0.48925 |
| 34 | O    | O34  | 0.69927 | 0.43558 | 0.49164 |
| 35 | O    | O35  | 0.44389 | 0.43501 | 0.48876 |
| 36 | O    | O36  | 0.19931 | 0.93896 | 0.49221 |
| 37 | O    | O37  | 0.54041 | 0.4367  | 0.84527 |
| 38 | O    | O38  | 0.28431 | 0.43673 | 0.8422  |
| 39 | O    | O39  | 0.03923 | 0.93309 | 0.84518 |
| 40 | O    | O40  | 0.78454 | 0.93558 | 0.84229 |
| 41 | O    | O41  | 0.5666  | 0.93536 | 0.41677 |
| 42 | O    | O42  | 0.41789 | 0.93805 | 0.91639 |
| 43 | O    | O43  | 0.91796 | 0.43314 | 0.91749 |
| 44 | O    | O44  | 0.06658 | 0.43879 | 0.41808 |
| 45 | Ti   | Ti1  | 0.22043 | 0.93658 | 0.24214 |
| 46 | Ti   | Ti2  | 0.06116 | 0.93641 | 0.09019 |
| 47 | Ti   | Ti3  | 0.72074 | 0.43715 | 0.24147 |
| 48 | Ti   | Ti4  | 0.56112 | 0.43659 | 0.09009 |
| 49 | Ti   | Ti5  | 0.76538 | 0.93697 | 0.09239 |
| 50 | Ti   | Ti6  | 0.92466 | 0.93757 | 0.2442  |
| 51 | Ti   | Ti7  | 0.26493 | 0.43673 | 0.09246 |
| 52 | Ti   | Ti8  | 0.42448 | 0.43642 | 0.24382 |
| 53 | Ti   | Ti9  | 0.21922 | 0.93567 | 0.59265 |
| 54 | Ti   | Ti10 | 0.06009 | 0.93443 | 0.74408 |
| 55 | Ti   | Ti11 | 0.71913 | 0.43538 | 0.59214 |
| 56 | Ti   | Ti12 | 0.56028 | 0.43575 | 0.74408 |
| 57 | Ti   | Ti13 | 0.26434 | 0.43449 | 0.7417  |
| 58 | Ti   | Ti14 | 0.42346 | 0.43479 | 0.58992 |
| 59 | Ti   | Ti15 | 0.76407 | 0.93521 | 0.74178 |
| 60 | Ti   | Ti16 | 0.9231  | 0.93527 | 0.59028 |
| 61 | Ti   | Ti17 | 0.58362 | 0.45134 | 0.41619 |
| 62 | Ti   | Ti18 | 0.40087 | 0.42763 | 0.91679 |
| 63 | Ti   | Ti19 | 0.90097 | 0.9446  | 0.91686 |
| 64 | Ti   | Ti20 | 0.08325 | 0.93465 | 0.41732 |
| 65 | Ca   | Ca1  | 0.87195 | 0.43614 | 0.41755 |
| 66 | Ca   | Ca2  | 0.37179 | 0.93857 | 0.41769 |
| 67 | Ca   | Ca3  | 0.61261 | 0.93498 | 0.91722 |
| 68 | Ca   | Ca4  | 0.11262 | 0.43539 | 0.91721 |

This Ca:TiO$_2$—B structure is used alone or as a template layer to grow (001) regular TiO$_2$—B thin films because direct deposition of pure TiO$_2$ on SrTiO$_3$ substrates usually results in the anatase phase, but highly crystalline TiO$_2$—B forms on the a-b plane of a Ca:TiO$_2$—B layer by ablating a pure TiO$_2$ target under the same growth conditions, mainly because of the near-perfect lattice match between the two phases. The morphology of both the Ca:TiO$_2$—B thin film and the TiO$_2$—B/Ca:TiO$_2$—B dual layer film on a (100) SrTiO$_3$ substrate are shown in FIG. 7. As shown in FIG. 7, both the Ca:TiO$_2$—B film and the TiO$_2$—B/Ca:TiO$_2$—B dual layer film have fairly smooth surfaces on the a-b plane due to the characteristically layered structure of bronze. Crystal defects including grain boundaries, dislocations and stacking faults are identifiable, but minimal. The structure parameters of the TiO$_2$—B films are in good agreement with values in the literature. A template layer with a thickness of 10 nm is developed, and no degradation of the TiO$_2$—B crystalline quality is observed. FIGS. 6C and 6D show the θ-2θ XRD pattern and the HAADF image, respectively, of the dual layer structure. The theoretical densities of Ca:TiO$_2$—B and TiO$_2$—B are determined to be 3.637 g cm$^{-3}$ and 3.616 g cm$^{-3}$, respectively, approximately 7% lower than that of anatase.

Figure 5:
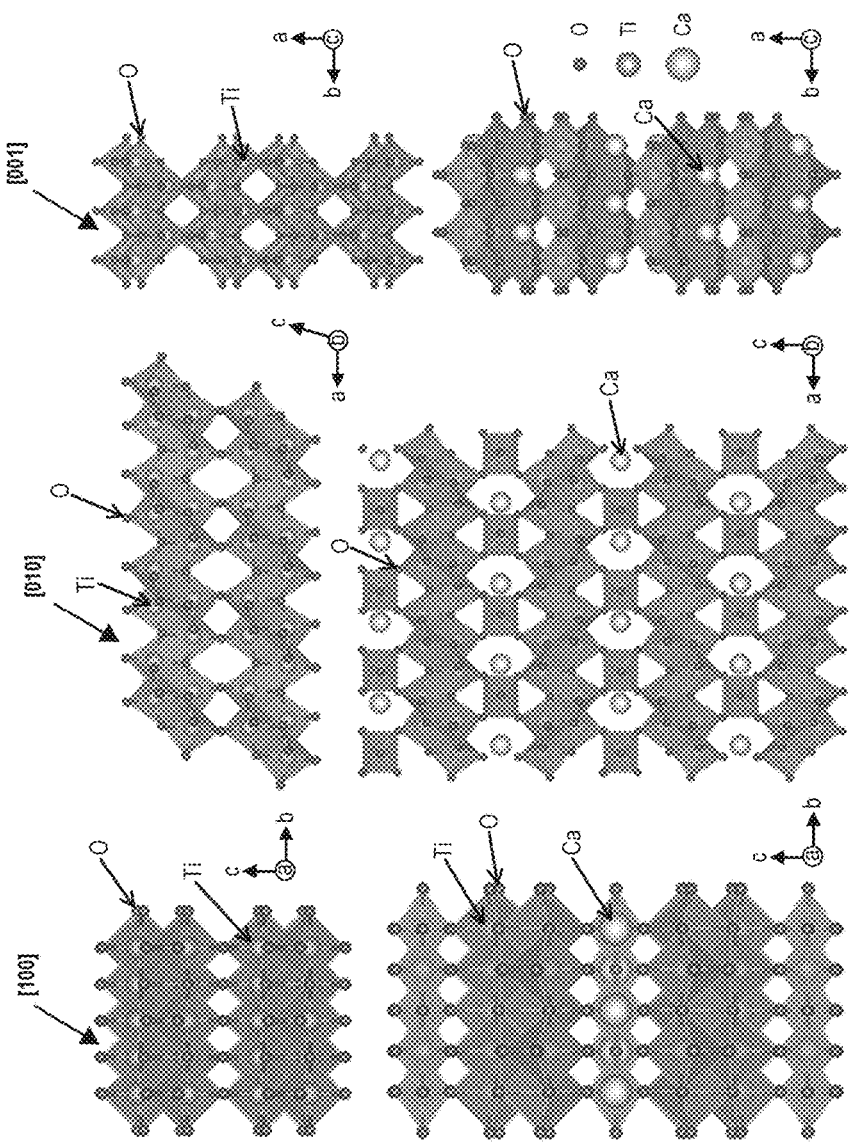
FIG. 5 shows crystal structures of regular $TiO_2$—B (top row) and Ca:$TiO_2$—B (CaTi$_5$O$_{11}$, bottom row) projected along [100], [010] and [001] directions, from left to right, which were produced using VESTA.

FIG. 5 shows the crystal structures of both regular TiO$_2$—B and its variant Ca:TiO$_2$—B phases. Although the extra Ca atoms make the latter more complicated, there is still a strong resemblance between the two structures. The STEM images in FIGS. 6B and 6D are clearly associated with the two atomic structures projected along the [010] direction in the center column of FIG. 5. The geometric model of the novel Ca:TiO$_2$—B phase is refined by analyzing the HR-STEM images and performing first-principles optimization. Again, the atom positions in the Ca:TiO$_2$—B structure are shown in Table 1.

With further reference to FIG. 5, by visual inspection, the channels running along the b-axis appear to be most open among the three crystallographic axes in both structures, and are a good candidate for high Li$^+$ mobility in the crystal. Channels parallel to various other directions can are also found by manipulating the model. It is worth noting that more rigorous study than simply observing the cross sectional areas of the channel opening is required to determine with relative certainty the actual diffusion path that is most energetically favorable for fast Li$^+$ transport, as the results may be counter-intuitive. The ability to fabricate crystalline thin films of the active storage material with well-defined lattice plane on the surface, such as those described herein, is therefore of great value to experimentally determine the preferred Li$^+$ pathways.

For both the Ca:TiO$_2$—B and TiO$_2$—B structures, Li$^+$ access into the crystal is expected to be easier in the a-b plane, i.e., through the well-aligned channels along the a-axis between layers of atoms (FIG. 5, and FIGS. 6B and 6D) as well as the possibly even faster channels along the b-axis, than in the perpendicular direction. Therefore, in some embodiments these open channels are exposed at the film surface to increase the rates of lithium ion transport, which in principle can be achieved by utilizing substrates with a different orientation. FIG. 8B shows the HAADF image of a Ca:TiO$_2$—B film deposited on a (110) SrTiO$_3$ substrate under the same growth conditions as above. Instead of being parallel to the surface, the a-b planes are now inclined, with channels along the a- and b-axes reaching the surface. FIG. 8A clearly displays a region near the boundary between two such grains, where one grain (right) has channels parallel to the a-axis running to the surface, and another grain (left) is rotated about the a-b plane normal having channels parallel to the b-axis running to the surface. FIG. 8B shows the polycrystalline nature of the film. However, such a Ca:TiO$_2$—B film does not serve as a good template layer for the subsequent growth of uniform TiO$_2$—B on top. Nonetheless, TiO$_2$—B is grown on the film.

To characterize their electrochemical properties, the thin films are assembled in half-cells with metallic Li as a counter electrode. To calculate specific capacity, the mass of active material is determined from its theoretical density, measured surface area and thickness. The mass loading of active material is about 0.036 mg/cm$^2$. Cycled cells are disassembled in the glove box, and post-cycling films are washed in dimethyl carbonate for three times and dried in vacuum overnight before XRD and TEM studies.

While using a conductive Nb:SrTiO$_3$ substrate as bottom current collector, electrons travel through the entire substrate to the external circuit, and therefore the electrochemical force may drive some Li$^+$ into the substrate. Even though SrTiO$_3$ does not appear to have a high Li$^+$ capacity, it is important to rule out the contribution from the substrate for determining the actual capacity of the film. Therefore, a bare Nb:SrTiO$_3$ substrate is assembled in a half-cell and tested with exactly the same routine and rates as for the thin film samples. The measured capacity of the substrate at each rate is then subtracted from the total to obtain the capacity of the film at that rate. It should be noted that the voltage window of 1-3 V for TiO$_2$—B film testing is much higher than the possible Li intercalation voltage of SrTiO$_3$, so the substrate contribution is very low, as seen in FIG. 9, which shows the control test at a 1 C rate.

A similar approach is needed to determine the capacity of the regular TiO$_2$—B phase. Since the TiO$_2$—B film is grown on top of a Ca:TiO$_2$—B template layer, the method for determining its specific capacity is to cycle the Ca:TiO$_2$—B sample and the TiO$_2$—B/Ca:TiO$_2$—B dual layer sample of the same sizes using exactly the same routine and rates, determine the specific capacity of Ca:TiO$_2$—B at each rate first, calculate the capacity contribution of the Ca:TiO$_2$—B layer in the dual layer sample from its thickness obtained by STEM, and finally subtract that part from the total capacity.

For thin films grown on insulating SrTiO$_3$ substrates and using the top current collection configuration, the substrate is not a part of the electrochemical reaction or the circuit, so its contribution to the measured capacity should be minimal and hence is not considered. To test the effectiveness of the experimental setup, cyclic voltammograms (CVs) of the TiO$_2$—B thin film sample are recorded at scan rates from 0.1 to 1 mV s$^{-1}$ as shown in FIG. 10A. A pair of redox peaks at 1.54 V and 1.69 V is observed, which represent the signature pseudocapacitive Li$^+$ storage behavior of TiO$_2$—B. The specific capacitance is calculated by integrating the CVs and the calculated capacitance is almost the same from either the oxidation or the reduction curve, regardless of scan rate, which also corresponds well with the specific capacity obtained from galvanostatic cycling, as shown in FIG. 10B. Such results directly prove the validity of the current testing methods.

For the purpose of comparing the effectiveness of these two configurations described above, two TiO$_2$—B/Ca:TiO$_2$—B dual layer control samples are grown simultaneously to the same thicknesses on a (100) SrTiO$_3$ substrate and a (100) 0.5 at. % Nb:SrTiO$_3$ substrate, respectively. XRD and TEM results confirm that the two films are of about equal quality. The former is processed in a top current collection geometry as in FIG. 4. Both samples, together with a bare Nb:SrTiO$_3$ substrate, are then assembled in half-cells with metallic Li counter electrodes and tested under 1 C and 10 C rates for 100 cycles. The discharge capacities of TiO$_2$—B obtained in the two samples are compared in FIG. 11. It is clear that the two test configurations produce similar results, while the capacity values acquired from the top Cu grid method are slightly higher. This is due to the fact that Cu metal provides better current collection efficiency than Nb:SrTiO$_3$ semiconductor substrate. Such an advantage becomes more significant as the rates increase beyond 10 C. Therefore, results of battery cycling performance reported herein are all acquired in the top Cu grid collector configuration.

For Ca:TiO$_2$—B, assuming 5 Li$^+$ is intercalated per CaTi$_5$O$_{11}$ formula unit (making all Ti 3$^+$), its theoretical capacity is estimated to be 294 mA h g$^{-1}$. For simplicity and comparison with TiO$_2$—B is defined as 1 C=335 mA g$^{-1}$. Superior charge/discharge rate capability is observed in the Ca:TiO$_2$—B film grown on (110) SrTiO$_3$ with open channels extending to the surface. Starting at 1 C, the battery half-cell was charged and discharged between 1 and 3 V for 50 cycles at each of several rates up to an extreme of 12000 C, ending again at 1 C immediately following the last cycle at 12000 C for additional 20 cycles to examine the structural stability. FIG. 8D shows the voltage curves of the 5th cycle at each rate. At 1 C, the film discharges to a specific capacity of 293 mA h g$^{-1}$, over 99.6% of the theoretical capacity. The capacity reduced to 248 mA h g$^{-1}$ at 10 C, 61.4 mA h g$^{-1}$ at 120 C, and 28.8 mA h g$^{-1}$ at 600 C. At 12000 C the capacity was 11.5 mA h g$^{-1}$, likely because only a fraction of the film close to the surface and the current collector is actually lithiated. When the rate was lowered back to 1 C, the capacity was immediately restored to 284 mA h g$^{-1}$, showing outstanding endurance of the material under extreme conditions. The majority of the capacity occurred in the sloped regions of the voltage profiles, while the specific capacity obtained by integrating the cyclic voltammograms was almost the same regardless of the scan rate (FIGS. 10A-10B), expressing the pseudocapacitive Faradaic behavior of Li storage in this material. The battery half-cell was continuously charged and discharged for 200 cycles at 60 C and 80 C, as shown in FIG. 8E, delivering discharge capacities of 155 mA h g$^{-1}$ and 102 mA h g$^{-1}$ at the 100th cycle, respectively. The capacity loss and the lower Coulombic efficiency in the first 10 cycles reflect the poor electrical conductivity characteristic of pure Ca:TiO$_2$—B. From cycle 10 to 200, however, the loss was only 0.1% per cycle, and the Coulombic efficiency close to 1.

Taking advantage of a clearly defined lattice orientation, the presumed preference for Li$^+$ transport along certain crystal directions is demonstrated. The rate capability of Ca:TiO$_2$—B thin films grown on (110) SrTiO$_3$ with channel openings on the surface is compared with both Ca:TiO$_2$—B and TiO$_2$—B grown on (100) SrTiO$_3$ with channels along a- and b-axes running parallel to the surface. Considering the impaired electron transport in these materials, all three samples are grown to almost the same thickness in order to ensure a fair comparison. Slow cycling tests at a C/10 rate shown in the inset of FIG. 12A are performed on the two (001) films that have in-plane a- and b-channels, where TiO$_2$—B and Ca:TiO$_2$—B discharge to 334 (Li$_{0.997}$TiO$_2$) and 273 mA h g$^{-1}$, respectively. As the rate increases (FIG. 12A), TiO$_2$—B delivers higher capacities than Ca:TiO$_2$—B at every rate, indicating that Li$^+$ transport along the out-of-plane direction is faster in TiO$_2$—B than in Ca:TiO$_2$—B, because the difference in theoretical capacity alone is unlikely to account for such discrepancy. On the other hand, the Ca:TiO$_2$—B film with exposed a- and b-channels exhibits far superior rate capabilities to both of the above, suggesting a better efficiency of inserting and extracting Li$^+$. The superiority becomes more and more significant with increasing rates. For example, its capacity at 60 C is even higher than the 10 C capacity of TiO$_2$—B and the 1 C capacity of the same Ca:TiO$_2$—B phase in the different crystal orientation. These results suggest that Li$^+$ transport into the bulk of the material is indeed much faster in the Ca:TiO$_2$—B film on (110) SrTiO$_3$, either because channels within the a-b plane are more favorable for Li$^+$ transport than those along the c-axis, or due to certain effects associated with the polycrystalline structure and grain boundaries.

Figure 4:
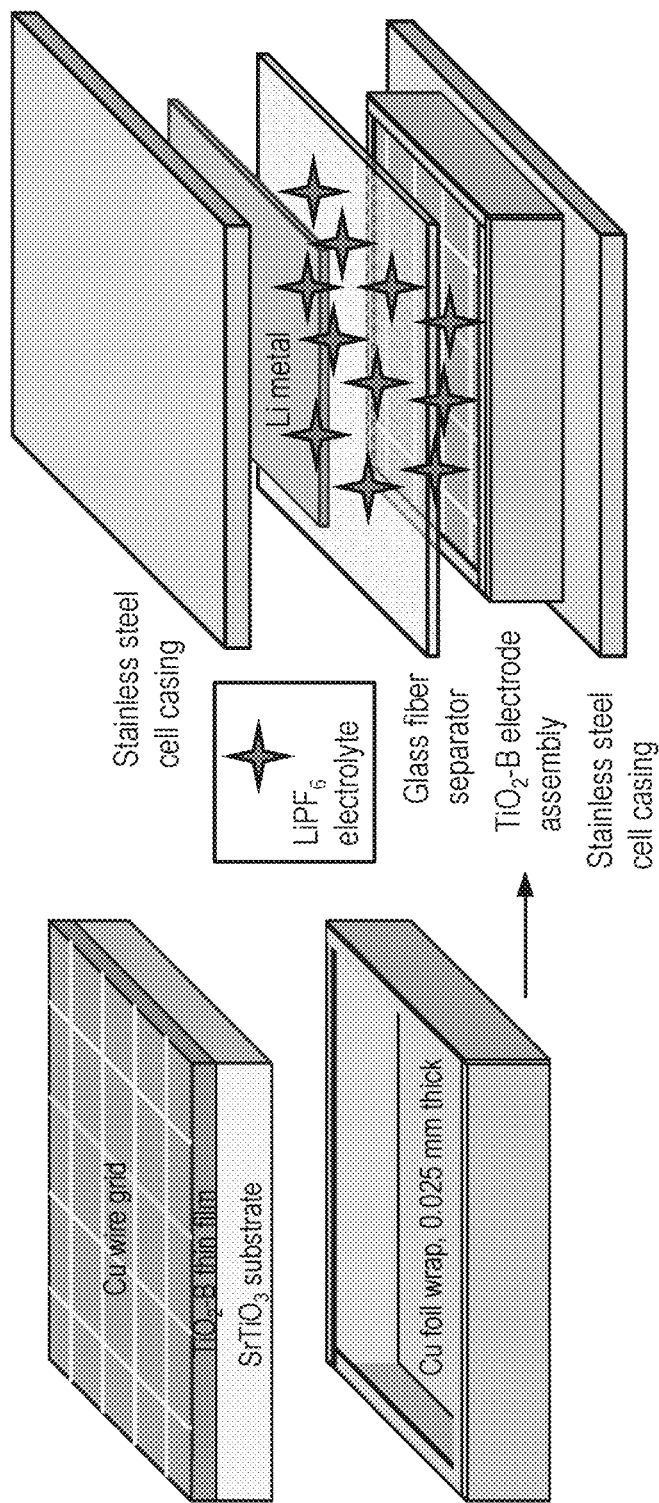
FIG. 4 is a perspective view of a top current collector configuration for electrochemical measurements, wherein films are grown on insulating 10×10 mm² SrTiO$_3$ substrates.

Slow charge/discharge cycling experiments at a C/10 rate are performed on a Ca:TiO$_2$—B film and a TiO$_2$—B film (with a thin Ca:TiO$_2$—B template layer) both grown on (100) SrTiO$_3$ substrates using the top Cu grid collector as shown in FIG. 4. The voltage profiles are displayed in the inset of FIG. 12A. Both samples exhibit sloped profiles corresponding to a pseudocapacitive process of Li$^+$ transport, which is a typical characteristic often observed for TiO$_2$—B. These results also support the conclusion that both the TiO$_2$—B and the Ca:TiO$_2$—B films have good purity without a pronounced amount of other TiO$_2$ polymorphs, which would otherwise create plateaus in the profiles.

The material's response to the intensive cycling is examined by XRD and transmission electron microscopy (TEM). As shown in FIGS. 12D and 12E, XRD patterns of both the TiO$_2$—B and Ca:TiO$_2$—B structures before and after being cycled for over 40 days are essentially unchanged. Atomic resolution TEM analysis confirms that all the bronze structures stay intact without any signs of significant degradation or collapse into other TiO$_2$ polymorphs. As an example, a post-cycling HAADF image of the inclined Ca:TiO$_2$—B structure is shown in FIG. 8C. Relatively subtle changes, however, are observed by comparing the images before and after cycling in the horizontally oriented (001) films. FIG. 12B shows a region near the interface between TiO$_2$—B and Ca:TiO$_2$—B template in an as-grown dual layer film on (100) SrTiO$_3$. A straight, inclined anatase "wall" about 3 nm wide stems from the interface and extends to the surface, separating two TiO$_2$—B grains. Upon lithiation, the anatase phase experiences a volumetric increase along the wall, while the TiO$_2$—B grain undergoes a contraction along its c-axis, and consequently creates a small fracture at the interface, as shown by the HAADF image in FIG. 12C. Such fractures are seen repeatedly in the post-cycling sample along the anatase walls, as shown in FIG. 14.

To confirm that Li$^+$ is inserted into the bronze films during cycling, fine XRD scans are performed on a (001) Ca:TiO$_2$—B film grown on a (100) SrTiO$_3$ substrate around the strongest available diffraction peak, 006, before and after charging with Li$^+$ at a rate of C/10. The results are shown in FIG. 13A. Using the SrTiO$_3$ substrate peaks as reference, the 006 peak of the lithiated film has shifted to lower 2θ angles, indicating a lattice expansion in the out-of-plane direction from Ca:TiO$_2$—B=17.98 Å to 18.04 Å. By fitting the experimental data, it is also clear that the peak has broadened as the inserted Li$^+$ disturbs the crystallinity of the lattice structure. The broadening is mainly caused by local straining within the thin film as the unit cell undergoes an asymmetric deformation upon lithiation. Structural defects such as dislocations and stacking faults may also contribute to straining effects in close regions and thus to the peak broadening.

The same experiments are performed around the TiO$_2$—B 001 peak of a (001) TiO$_2$—B/Ca:TiO$_2$—B dual layer film grown on a (100) SrTiO$_3$ substrate. FIG. 13B shows that C$_{TiO2-B}$ exhibits a slight contraction of ~0.21% upon lithiation, which is in good agreement with the literature, where neutron diffraction results revealed a contraction in C$_{TiO2-B}$ of 0.18%-0.49%, depending on the Li content. An obvious peak broadening is again observed.

It should be noted that the lattice constant changes observed with this procedure may not correspond to fully lithiated films. The thin films have a large surface exposed to the electrolyte and a small mass, so an unknown amount of Li charged into the film could be lost to the electrolyte via self-discharge before the cell is disassembled and the electrode is examined. Although this might also happen in the more typical powder samples of TiO$_2$—B, the much larger amount of active material used there may ensure that more of the Li is retained in the sample. Such a difference in sample geometry may help explain the discrepancy between our observation and the reported values in the literature. Water and anatase impurities may also have an effect on the values reported for TiO$_2$—B in the literature.

As discussed with regard to FIG. 12C, the larger volumetric changes of the anatase walls in the TiO$_2$—B films can fracture the structure during Li$^+$ insertion and extraction. FIG. 14 shows a wider area of the same film, where such fracturing always occurs along the inclined anatase walls throughout the film, some at the interface of $TiO_2$—B and Ca:$TiO_2$—B and others inside the $TiO_2$—B phase. Therefore, this fracturing should be an actual effect of the $Li^+$ insertion and extraction rather than an incidental event. A longer fracture could form between two parallel anatase walls. Because of the layered structure of $TiO_2$—B, all fractures are parallel to the a-b planes.

FIGS. 13A-13B also show that $Li^+$ is being inserted into the films comes from XRD, where fine scans are performed around the Ca:$TiO_2$—B 006 peak and $TiO_2$—B 001 peak on respective (001) films before and after lithiation. Shifts in the peak positions indicate a slight increase in the c-axis lattice constant of Ca:$TiO_2$—B and a slight decrease in that of $TiO_2$—B. A broadening is also observed in both peaks as the inserted $Li^+$ causes local straining.

As known in the art, Li plating may occur at the interface of electrolyte and Cu current collector, which would result in erroneously higher capacity measured for the Li storage material in battery cycling tests. To rule out the influence of possible Li plating on the Cu grid, a Ca:$TiO_2$—B thin film sample with top Cu grid current collector is charged and discharged at the rate of 1000 C for 20 cycles, taken out of the cell at a half cycle when the film was fully charged with $Li^+$, and examined with an FEI Quanta scanning electron microscope. The surface image and the X-ray energy dispersive spectrum from the Cu wire are shown in FIGS. 15A-15B. No obvious Li dendrite formation is observed either on the Cu wire or on the Ca:$TiO_2$—B film.

In certain variations, by aligning the material to a preferred orientation, the titania-bronze structure can safely work at extremely high rates, delivering specific power of ~20 kW $kg^{-1}$ at 60 C and ~280 kW $kg^{-1}$ at 12000 C. Coupling with a cathode material that sustains ultrahigh rates, such as $LiFePO_4$ and its modifications, a superfast-charging full-cell may be made. High crystalline quality $TiO_2$—B or Ca:$TiO_2$—B films can be used to fabricate LIBs and other devices.

Example 2

Multilayered Stacks Comprising $TiO_2$—B Thin Films Embedded with Electrically Conductive Nanoparticles A thin film of Pt—$TiO_2$—B is generated on a layer of Ca:$TiO_2$—B to form a multilayered stack. An image of the multilayered stack having the Pt—$TiO_2$—B and Ca:$TiO_2$—B layers is shown in FIG. 16. This image shows a substantially uniform density of Pt nanoparticles embedded within $TiO_2$—B. The multilayered stack has a particle concentration n of $2.82\times10^{19}$ $cm^{-3}$, a resistivity ρ of 0.033 Ω·cm, and an electron mobility μ of 6.65 $cm^2$/Vs.

FIGS. 17A-17C show images of a multilayered stack having a $SrTiO_3$ substrate, a layer of Ca:$TiO_2$—B positioned on the substrate, and a layer of Pt—$TiO_2$—B positioned on the Ca:$TiO_2$—B layer. The Pt nanoparticles increase in relative concentration/density from a first surface of the Pt—$TiO_2$—B layer adjacent to the Ca:$TiO_2$—B layer to a second opposing surface. Rutherford Backscattered Spectroscopy (RBS) results show that the Pt—$TiO_2$—B layer includes about 1.5% Pt, 33.5% Ti, and about 65% O.

In FIG. 18, the rate capability of Pt—$TiO_2$—B thin films grown on (001) $SrTiO_3$ generated under vacuum and under 16 mT $O_2$ with channel openings on the surface is compared with the films shown in FIG. 12A. The film grown in vacuum (labeled "x," having a high concentration/density of Pt nanoparticles) maintains energy storage capability at extremely high rates due to enhanced electrical conductivity. Such a device is suitable for high power application, such as, for example, in electric cars. The film grown in 16 mT $O_2$ (labeled "▲," low density of Pt nanoparticles) has high capacity at lower rates. Such a device is suitable for applications that emphasize large capacity, but do not require high power output, such as, for example, mobile electronics. Both Pt—$TiO_2$—B devices can be used for environmental applications, such as, for example, for photocatalysis.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A composition comprising calcium-doped titania bronze (Ca:$TiO_2$—B), wherein the Ca:$TiO_2$—B is a crystalline calcium titanate in which calcium ions are uniformly distributed throughout a titanate structure.

2. The composition according to claim 1, wherein the Ca:$TiO_2$—B comprises open channels aligned to out-of-plane directions.

3. The composition according to claim 1, wherein the Ca:$TiO_2$—B is free from water molecules.

4. The composition according to claim 1, wherein the Ca:$TiO_2$—B has a unit cell with an orthorhombic structure with a symmetry of CMCM (63).

5. The composition according to claim 4, wherein the Ca:$TiO_2$—B unit cell has lattice constants of a=12.1702 Å, b=3.8013 Å, c=17.9841 Å, and α=β=γ=90°.

6. A structure for an electronic device comprising a substrate and a layer of calcium-doped bronze (Ca:$TiO_2$—B), wherein the Ca:$TiO_2$—B is a crystalline calcium titanate in which calcium ions are uniformly distributed throughout a titanate structure.

7. The structure according to claim 6, wherein the substrate comprises a perovskite material comprising molecules having a formula $ABX_3$, wherein A and B are cations of different sizes and X is an anion that bonds to both cations.

8. The structure according to claim 7, wherein the perovskite material is selected from the group consisting of: $SrTiO_3$, $BaTiO_3$, $MgSiO_3$, $CaTiO_3$, $FeTiO_3$, $LaMnO_3$, $PbTiO_3$, and mixtures thereof.

9. The structure according to claim 8, wherein the perovskite material comprises strontium titanate ($SrTiO_3$).

10. The structure according to claim 7, wherein the perovskite material is doped.

11. The structure according to claim 10, wherein the perovskite material comprises $SrTiO_3$ doped with niobium (Nb:$SrTiO_3$).

12. The structure according to claim 6, wherein the substrate comprises a perovskite material and the layer of Ca:$TiO_2$—B is in direct contact with the substrate.

13. The structure according to claim 6, wherein the substrate comprises silicon (Si).

14. The structure according to claim 13, further comprising a buffer layer comprising a perovskite material positioned directly between the substrate and the layer of Ca:$TiO_2$—B.

15. The structure according to claim 14, wherein the perovskite material is a perovskite oxide selected from the group consisting of: $SrTiO_3$, $BaTiO_3$, $MgSiO_3$, $CaTiO_3$, $FeTiO_3$, $LaMnO_3$, $PbTiO_3$, and mixtures thereof.

16. The structure according to claim 6, wherein the layer of Ca:TiO$_2$—B is a template layer for an additional layer.

17. The structure according to claim 16, further comprising a second layer of pure bronze (TiO$_2$—B) deposited on the layer of Ca:TiO$_2$—B.

18. The structure according to claim 16, further comprising a second layer of titanium bronze comprising with platinum (Pt—TiO$_2$—B) deposited on the layer of Ca:TiO$_2$—B.

19. A multilayered structure comprising:
a layer of perovskite material;
a layer of calcium-doped bronze (Ca:TiO$_2$—B) in contact with the layer of perovskite material; and
a layer of pure bronze (TiO$_2$—B) in contact with the layer of Ca:TiO$_2$—B,
wherein the layer of Ca:TiO$_2$—B is between the layer of perovskite material and the layer of TiO$_2$—B.

20. The multilayered structure according to claim 19, wherein the layer of perovskite material is a substrate.

21. The multilayered structure according to claim 20, wherein the perovskite material comprises strontium titanate (SrTiO$_3$) doped with niobium (Nb:SrTiO$_3$).

22. The multilayered structure according to claim 19, wherein there is a near-perfect lattice match between surface structures of the Ca:TiO$_2$—B layer and the TiO$_2$—B layer.

23. The multilayered structure according to claim 19, wherein the layer of perovskite material is directly layered onto a silicon (Si) substrate.

24. The multilayered structure according to claim 19, wherein the layer of pure bronze (TiO$_2$—B) further comprises electrically conductive nanoparticles.

25. The multilayered structure according to claim 24, wherein the electrically conductive nanoparticles are platinum nanoparticles.

26. A lithium ion battery comprising the multilayered structure of claim 19.

27. A method for making a multilayered structure comprising:
depositing a layer of calcium-doped bronze (Ca:TiO$_2$—B) onto a substrate by pulsed laser deposition (PLD), wherein the PLD comprises laser ablating of a calcium titanium oxide (CaTi$_4$O$_9$) target to generate the Ca:TiO$_2$—B, wherein the Ca:TiO$_2$—B is a crystalline calcium titanate in which calcium ions are uniformly distributed throughout a titanate structure.

28. The method according to claim 27, wherein the substrate comprises a perovskite material selected from the group consisting of: SrTiO$_3$, BaTiO$_3$, MgSiO$_3$, CaTiO$_3$, FeTiO$_3$, LaMnO$_3$, PbTiO$_3$, and mixtures thereof.

29. The method according to claim 27, wherein the substrate comprises SrTiO$_3$ doped with niobium (Nb:SrTiO$_3$).

30. The method according to claim 27, wherein the substrate comprises silicon (Si), and the method further comprises modifying the substrate before the depositing the layer of calcium-doped bronze (Ca:TiO$_2$—B) by first depositing a second layer of a perovskite oxide onto the substrate by epitaxial growth, wherein the perovskite oxide is selected from the group consisting of: SrTiO$_3$, BaTiO$_3$, MgSiO$_3$, CaTiO$_3$, FeTiO$_3$, LaMnO$_3$, PbTiO$_3$, and mixtures thereof.

31. The method according to claim 27, further comprising forming the CaTi$_4$O$_9$ target by:
  i. preparing a mixture comprising greater than or equal to about 50% by weight to less than or equal to about 90% by weight TiO$_2$ powder with greater than or equal to 10% to less than or equal to about 50% by weight of a powder selected from CaO powder, CaTiO$_3$ powder, or combinations thereof;
  ii. sintering the mixture at a temperature greater than or equal to about 1000° C. to less than or equal to about 2000° C. to generate a powdered material; and
  iii. pressing the powdered material into a pellet under greater than or equal to about 5000 lbs of force to less than or equal to about 15,000 lbs of force to generate the CaTi$_4$O$_9$ target.

32. The method according to claim 31, wherein the mixture comprises 80% by weight TiO$_2$ and 20% by weight CaO; the sintering is performed at a temperature of about 1400° C.; and the pressing is performed under about 10,000 lbs of force.

33. The method according to claim 27, wherein the depositing the layer of calcium-doped bronze (Ca:TiO$_2$—B) by PLD comprises depositing the layer of Ca:TiO$_2$—B at a temperature of about 800° C.

34. The method according to claim 27, wherein the laser ablating is performed with a 248 nm KrF excimer laser with a pulse duration of 22 ns, a fluence of about 3.4 J cm$^{-2}$, and a 10 Hz repetition rate.

35. The method according to claim 27, further comprising depositing a layer of pure bronze (TiO$_2$—B) onto the layer of Ca:TiO$_2$—B.

36. The method according to claim 35, wherein the depositing the layer of TiO$_2$—B is performed by PLD, wherein the PLD comprises laser ablating a pure TiO$_2$ target to generate the TiO$_2$—B.

* * * * *